(12) United States Patent
Krampotich et al.

(10) Patent No.: US 7,097,473 B2
(45) Date of Patent: Aug. 29, 2006

(54) CABLE CLIP

(75) Inventors: Dennis J. Krampotich, Shakopee, MN (US); Thomas C. Tinucci, Chaska, MN (US); John C. Holman, Coon Rapids, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/228,093

(22) Filed: Sep. 16, 2005

(65) Prior Publication Data

US 2006/0008235 A1 Jan. 12, 2006

Related U.S. Application Data

(63) Continuation of application No. 10/761,078, filed on Jan. 20, 2004, now Pat. No. 6,947,654, which is a continuation of application No. 10/233,018, filed on Aug. 30, 2002, now Pat. No. 6,771,871, which is a continuation-in-part of application No. 09/811,368, filed on Mar. 16, 2001, now Pat. No. 6,768,858.

(51) Int. Cl.
 *G02B 6/00* (2006.01)
(52) U.S. Cl. .................. 439/134; 439/136; 439/137
(58) Field of Classification Search ............... 385/134, 385/136, 137, 135
See application file for complete search history.

(56) References Cited

U.S. PATENT DOCUMENTS

| 4,359,262 A | 11/1982 | Dolan |
| 4,962,989 A | 10/1990 | Jung et al. |
| 5,285,515 A | 2/1994 | Milanowski et al. |
| 5,487,123 A | 1/1996 | Fowble |
| 5,535,298 A | 7/1996 | Fasnacht et al. |
| 5,613,029 A | 3/1997 | Burek et al. |
| 5,625,737 A | 4/1997 | Saito |
| 5,715,348 A | 2/1998 | Falkenberg et al. |
| 5,765,698 A | 6/1998 | Bullivant |
| 6,044,194 A | 3/2000 | Meyerhoefer |
| 6,212,324 B1 | 4/2001 | Lin et al. |
| 6,470,129 B1 | 10/2002 | Wentworth et al. |
| 6,768,858 B1 | 7/2004 | Tinucci et al. |
| 6,771,871 B1 | 8/2004 | Krampotich et al. |
| 6,947,654 B1 | 9/2005 | Krampotich et al. |
| 2002/0003940 A1 | 1/2002 | Araki et al. |

FOREIGN PATENT DOCUMENTS

| JP | 10-274359 | 10/1998 |
| JP | 11-122758 | 4/1999 |
| WO | WO 02/075887 A2 | 9/2002 |
| WO | WO 02/075888 A2 | 9/2002 |

OTHER PUBLICATIONS

U.S. Appl. No. 09/810,935, filed Mar. 16, 2001.
Copy of front and rear cover, and pp. 109-117 and 140-141 of Richco Inc. Catalog 25R, undated.

*Primary Examiner*—Chandrika Prasad
(74) *Attorney, Agent, or Firm*—Merchant & Gould P.C.

(57) ABSTRACT

A cable clip includes a housing defining an open space and outer grooves about the housing for mounting the cable clip into a mounting opening, the inner edge of the housing including trumpet flares around the edges of the ends and side to provide bend radius protection for cables passing through the clip and a gate closing off the open sided space. The gate may be attached to the housing by a living hinge.

11 Claims, 26 Drawing Sheets

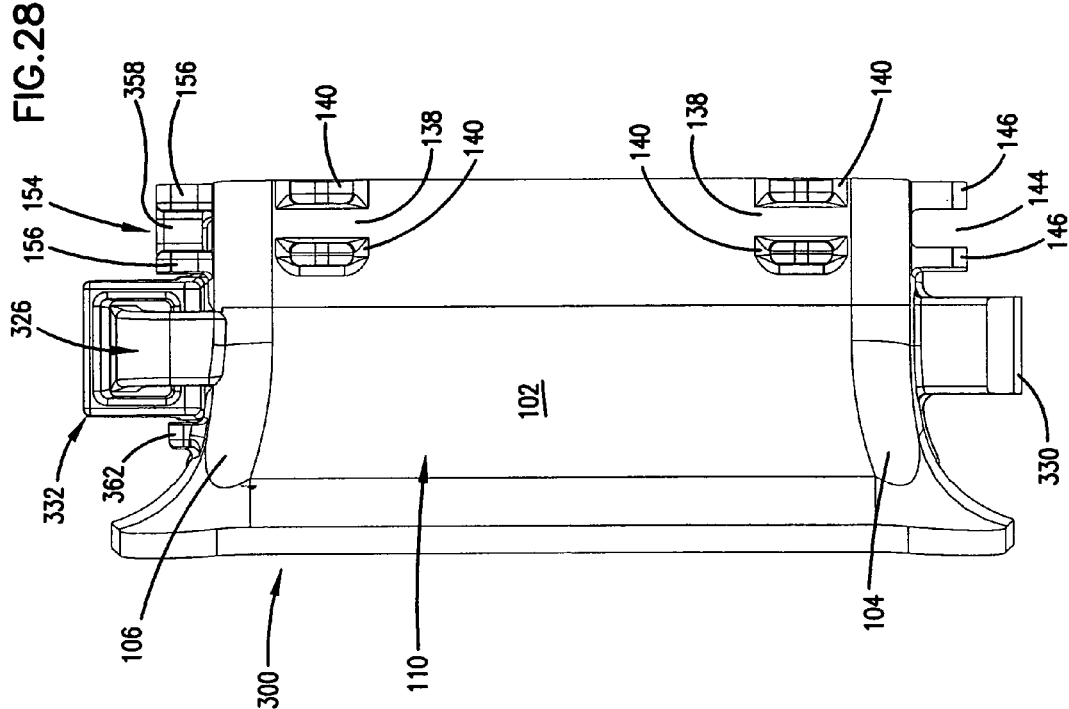
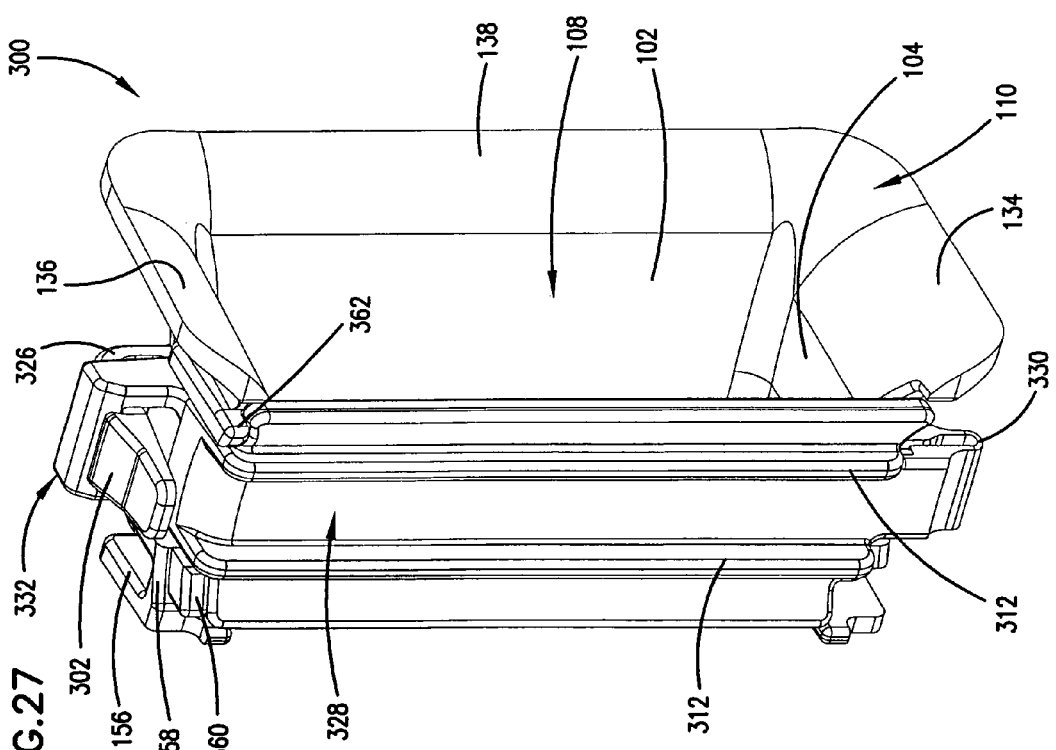

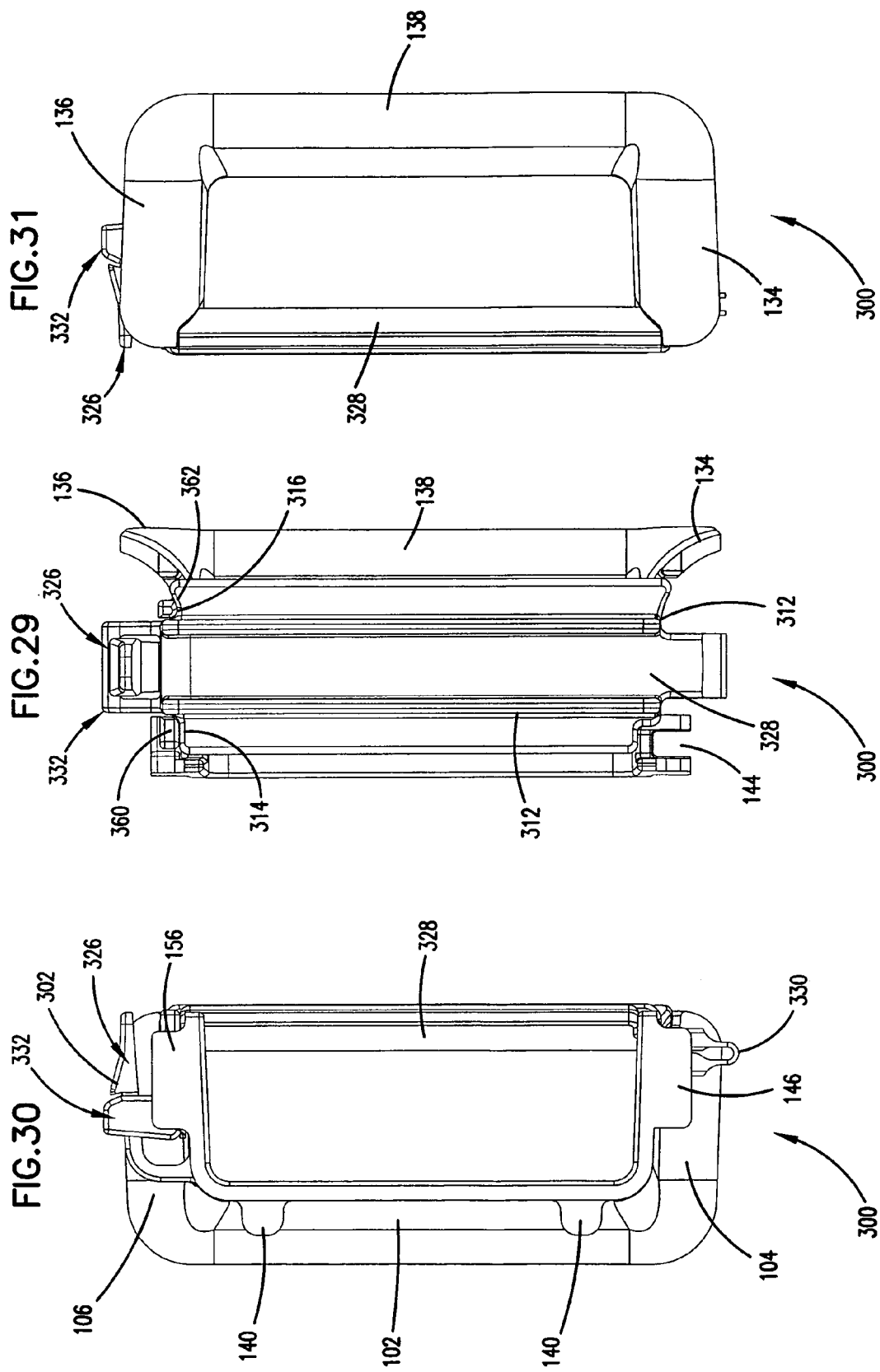

US 7,097,473 B2

CABLE CLIP

This application is a continuation of U.S. application Ser. No. 10/761,078, filed Jan. 20, 2004, now U.S. Pat. No. 6,947,654, issued Sep. 20, 2005, which is a continuation of U.S. application Ser. No. 10/233,018, filed Aug. 30, 2002, now U.S. Pat. No. 6,771,871, issued Aug. 3, 2004, which is a continuation in part of U.S. application Ser. No. 09/811,368, filed Mar. 16, 2001, now U.S. Pat. No. 6,768,858, issued Jul. 27, 2004, which applications are incorporated herein by reference.

FIELD OF THE INVENTION

The present invention relates to fiber optic cable and other cable management for use in telecommunications systems.

BACKGROUND OF THE INVENTION

Telecommunications equipment utilizing optical fiber for signal transmission is often mounted within equipment racks that permit a high density of connections to be made in a small space. A high density of connections means that a large number of optical fiber cables will need to be routed to and from the equipment, also in a small space. While the high density of connections possible with optical fiber is one of the principal reasons for utilizing optical fiber in this sort of environment, organizing the large number of optical fiber cables connected to the equipment can be difficult. This difficulty most often arises with respect to the cross-connect or jumper cables connected to these telecommunications racks. Copper systems also experience similar cable management issues.

The outside plant or interfacility cables connected to such equipment are cables which by their nature do not require frequent disconnect or reconnect, and which are also bundled more densely, with multiple fibers being held within a single cable. In contrast, the cables connected to the front of these equipment racks are single fiber cables which may be disconnected or reconnected often in the course of normal use and configuration of the equipment. The higher number of individual cables and the need to be able to readily move connections require the provision of clear cable segregation, labeling and organization proximate to the front connections of these telecommunications installations.

SUMMARY OF THE INVENTION

One aspect of the present invention relates to a cable clip includes a housing defining an open space and outer grooves about the housing for mounting the cable clip into a mounting opening, the inner edge of the housing including trumpet flares around the edges of the ends and side to provide bend radius protection for cables passing through the clip, the clip including a movable gate closing off the open sided space. The gate may be attached to the housing by a living hinge.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 27 is a front perspective view of the cable clip of FIG. 26 with the door in a closed position.

FIG. 28 is a rear view of the cable clip of FIG. 27.

FIG. 29 is a front view of the cable clip of FIG. 27.

FIG. 30 is a left side view of the cable clip of FIG. 27.

FIG. 31 is a right side view of the cable clip of FIG. 27.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
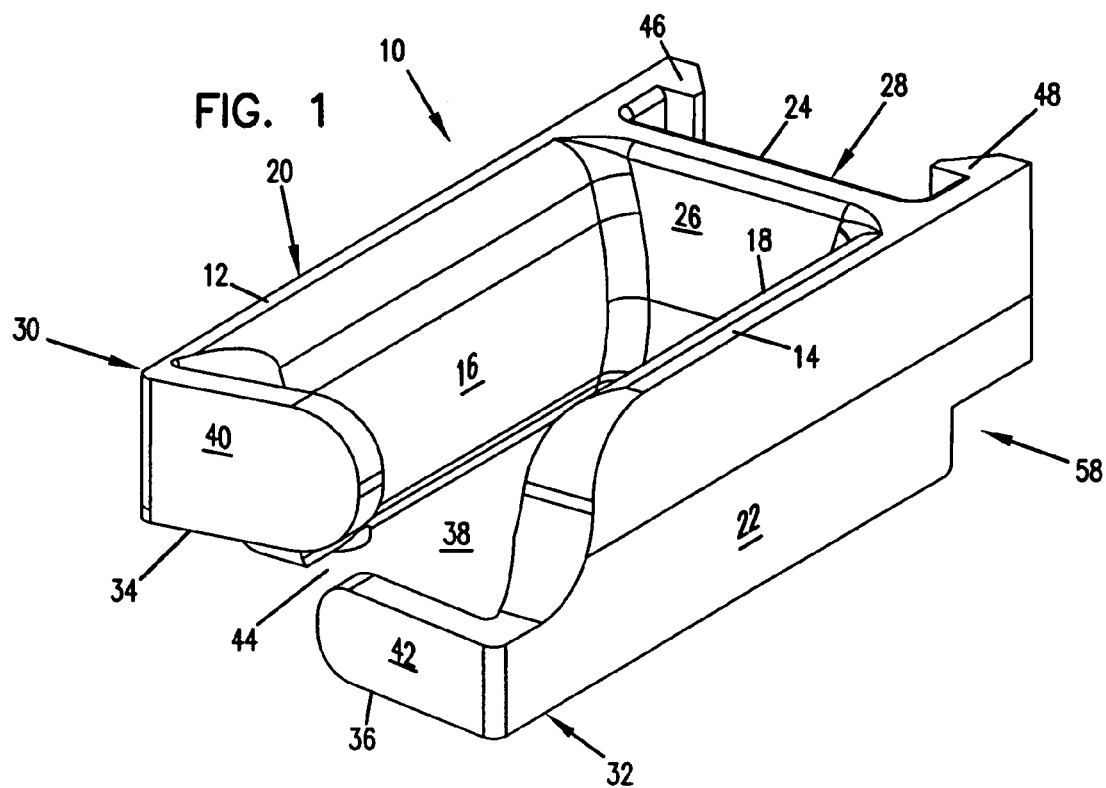
FIG. 1 is a front perspective view of a cable routing clip according to the present invention.
Figure 2:
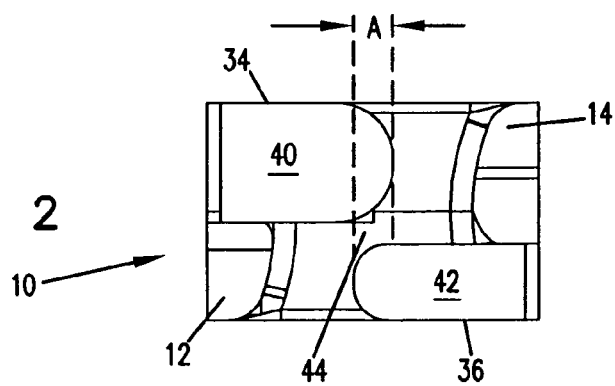
FIG. 2 is a front-end view of the cable routing clip of FIG. 1.
Figure 5:
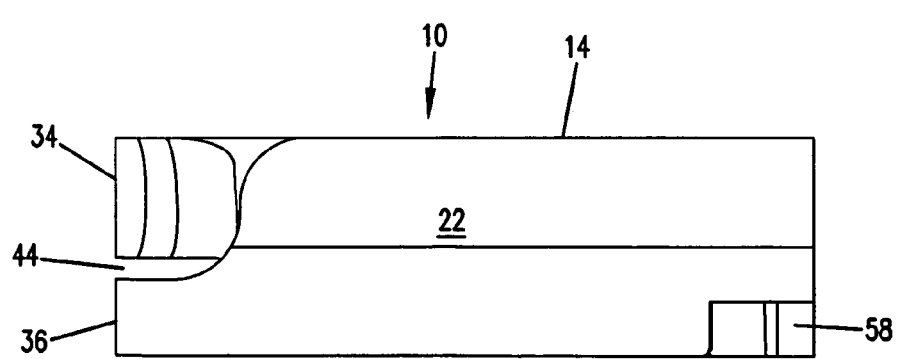
FIG. 5 is a second side view of the cable routing clip of FIG. 1.
Figure 3:
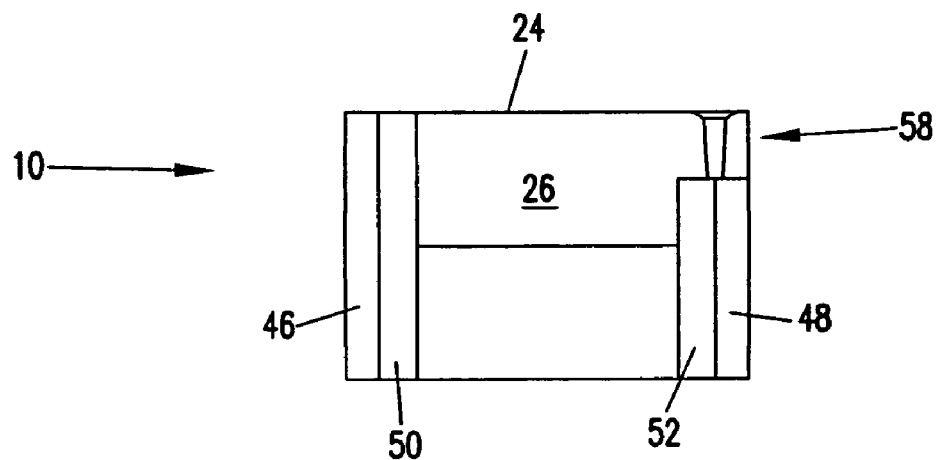
FIG. 3 is a rear end view of the cable routing clip of FIG. 1.
Figure 4:
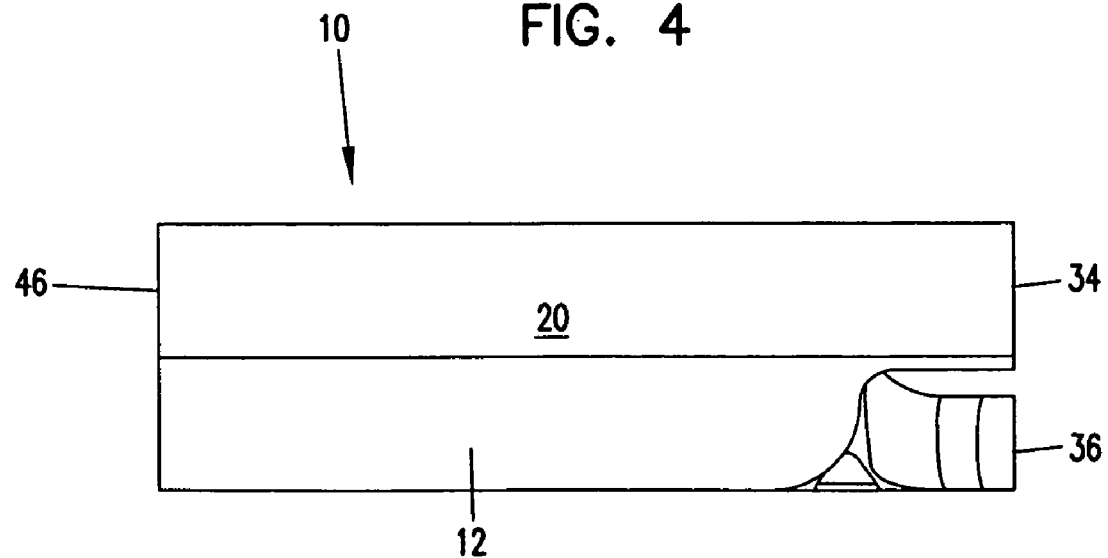
FIG. 4 is a first side view of the cable routing clip of FIG. 1.
Figure 6:
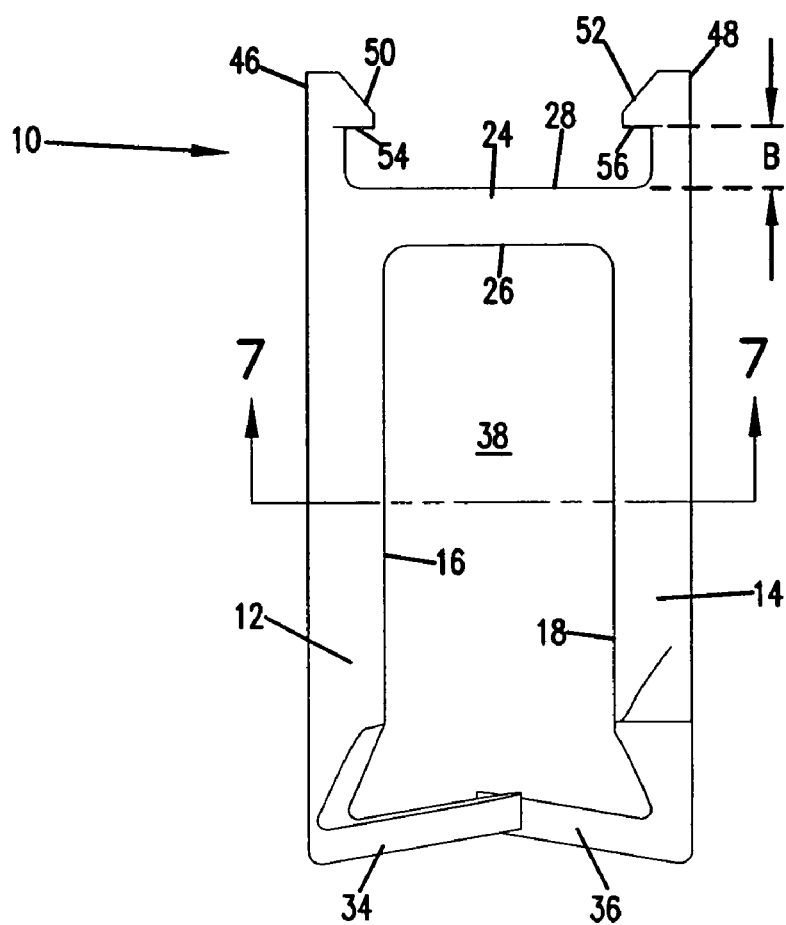
FIG. 6 is a top view of the cable routing clip of FIG. 1.

Referring now to FIGS. 1 through 10, a cable routing clip 10 for organizing cables is shown. Clip 10 is useful in a variety of structures, including a cable riser 200 discussed below, for managing telecommunications cables. Clip 10 includes two clip arms 12 and 14, which have inner faces 16 and 18, respectively and outer faces 20 and 22, respectively. A crosspiece 24 extends between the two clip arms 12 and 14, and crosspiece 24 has a front side 26 and a rear side 28. Clip arms 12 and 14 have outer ends 30 and 32, respectively. Retaining tabs 34 and 36 are mounted at outer ends 30 and 32 and extend across a slot 38 which defined by crosspiece 24, and clip arms 12 and 14. Retaining tabs 34 and 36 have outer faces 40 and 42. Outer faces 20 and 22 of clips arms 12 and 14, and outer faces 40 of retaining tab 34 are sized and shaped to receive indicia of the cables held within slot 38. Outer face 42 of retaining tab 36 may also be shaped to receive such indicia. Retaining tabs 34 and 36 cooperate to extend fully across the width of slot 38. As shown in FIG. 2, the retaining tabs actually overlap by an amount A. Retaining tabs 34 and 36 are less than the height of clip arms 12 and 14 and are offset from each other to form a gap 44. Cables may be placed within or removed from slot 38 by passing the cables through gap 44. Clip 10 is made of a resilient, deformable material so that cables that might have a diameter or size greater than the width of gap 44 can still be inserted into slot 38 through gap 44. The overlap A of retaining tabs 34 and 36 is sufficient to permit some outward deformation of clip arms 12 and 14 and still have retaining tabs 34 and 36 extending across slot 38. In FIG. 6, retaining tabs 34 and 36 are shown angled slightly in toward slot 38. Cable movement within slot 38 may cause a cable to apply pressure to the inside of retaining tabs 34 or 36. Biasing the tabs inward toward slot 38 will aid the tabs in resisting this pressure and maintain closure of slot 38 so that no cable are allowed to escape.

Extending longitudinally from rear side 28 of crosspiece 24 are mounting tabs 46 and 48, adapted for mounting clip 10 to a wall of a telecommunications equipment rack, a cable riser, or other suitable location. Mounting tabs 46 and 48 are generally parallel with clip arms 12 and 14 and generally extend co-linearly with clip arms 12 and 14, respectively. Mounting tabs 46 and 48 are designed to fit into vertical tabs slots in sheet metal walls, such as shown in FIGS. 20 through 23, discussed below. Tabs 46 includes a ramped face 50 and a locking notch 54, which is spaced apart from rear side 28 by a distance B. Tab 48, ramped face 52 and locking notch 56 are similarly configured. Distance B is based upon the thickness of the wall into which clip 10 will be inserted. Thicker walls will require a larger distance B and thinner walls will permit a smaller distance B. When tabs 46 and 48 are inserted into mounting slots in a wall, ramped faces 50 and 52 press against the inner side of the mounting slots to force tabs 46 and 48 to be deformed outward. After the ramped faces have passed through the mounting slots, tabs 46 and 48, being made of resilient, deformable material return to their original shape and locking notches 54 and 56 engage the opposite side of the wall to hold clip 10 in place with face 28 against the wall. In the embodiment shown in FIGS. 1 through 7, mounting tab 48 has a recess 58, so that tab 48 does not extend to the same height as tab 46. In situations where the insertion orientation of clip 10 needs to be fixed, the mounting slot for receiving tab 48 can be made shorter than the mounting slot for receiving tab 46, thus forcing clip 10 to mounted in the desired orientation.

Figure 7:
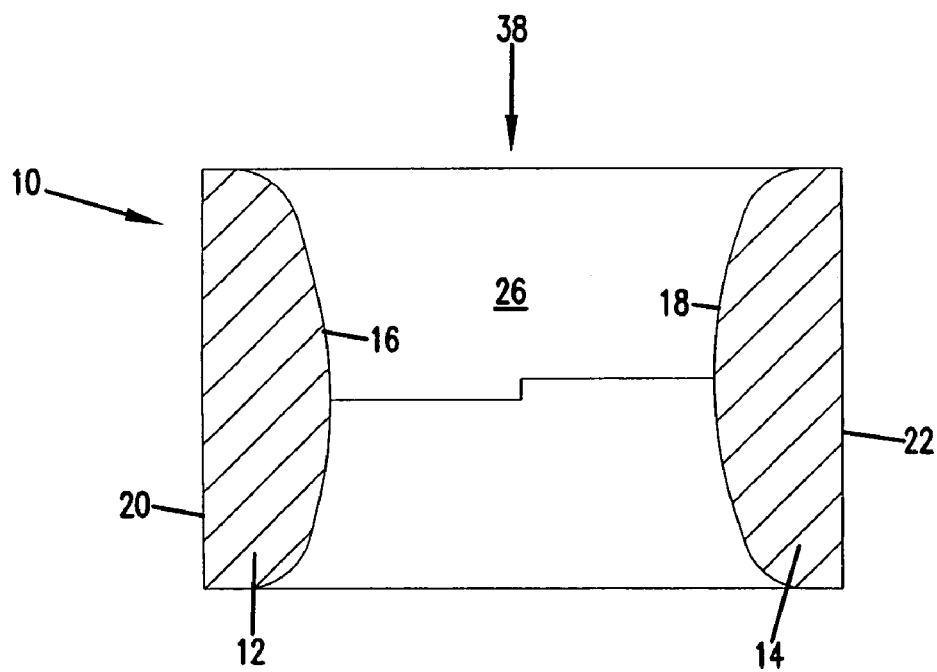
FIG. 7 is a cross-sectional view of the cable routing clip of FIG. 1, taken at line 7—7 in FIG. 6.

Referring now to FIG. 7, a cross-section of clip arms 12 and 14 is shown. Cables passing through slot 38 may be directed to one side or the other after they pass through the slot. To prevent violation of bend radius rules for these cables, inner faces 16 and 18 of clip 10 are curved.

Figure 9:
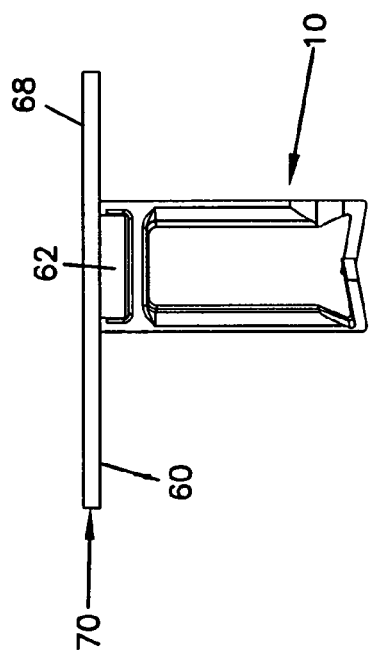
FIG. 9 is a top view of the bridge mounting of FIG. 8.
Figure 10:
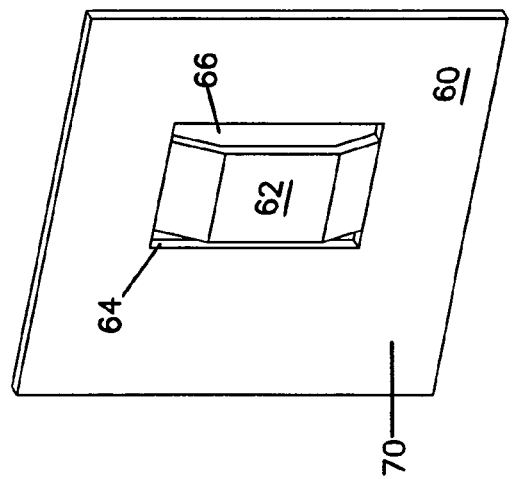
FIG. 10 is a front perspective view of the wall structure for the bridge mounting of FIG. 8.
Figure 8:
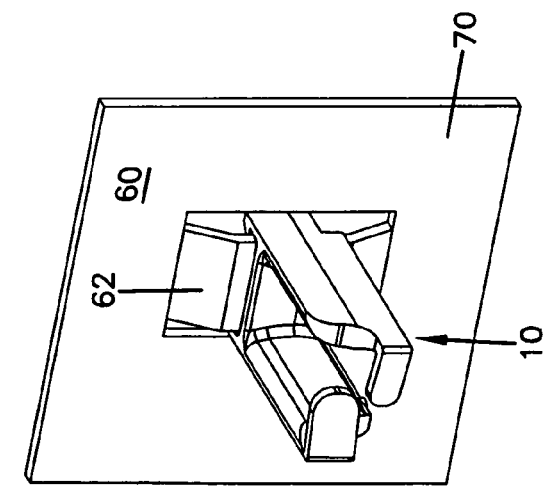
FIG. 8 is a front perspective view of a bridge mounting for the cable routing clip of FIG. 1.
Figure 11:
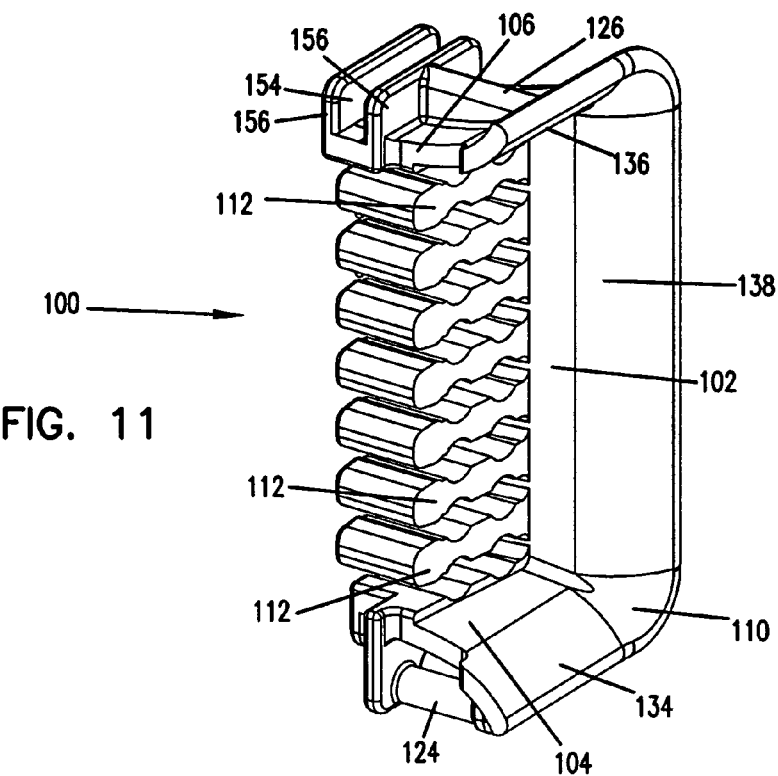
FIG. 11 is a perspective view of a cable clip and cable segregator according to the present invention.

Referring now to FIGS. 8 through 10, an alternative bridge mounting approach for clip 10 is shown. In certain installations, it may be necessary or desirable to mount clips to the front of a wall without having the mounting tabs protruding beyond the rear of the wall. A wall segment 70 is shown, with a front face 60 to which a clip 10 will be mounted. A bridge 62 is formed in the wall 70, protruding from the front face 60 and having mounting slots 64 and 66 on either side. Mounting tabs 46 and 48 are inserted into slots 64 and 66 as described above and locking notches 54 and 56 engage the rear of bridge 62. Bridge 62 extends far enough out from front 60 of wall 70 so that mounting tabs 46 and 48 do not protrude beyond rear face 68 when clip 10 is mounted on wall 70. Mounting slots 64 and 66 shown in FIGS. 8 through 10 are not sized to force the insertion of clip 10 in a particular orientation.

Figure 15:
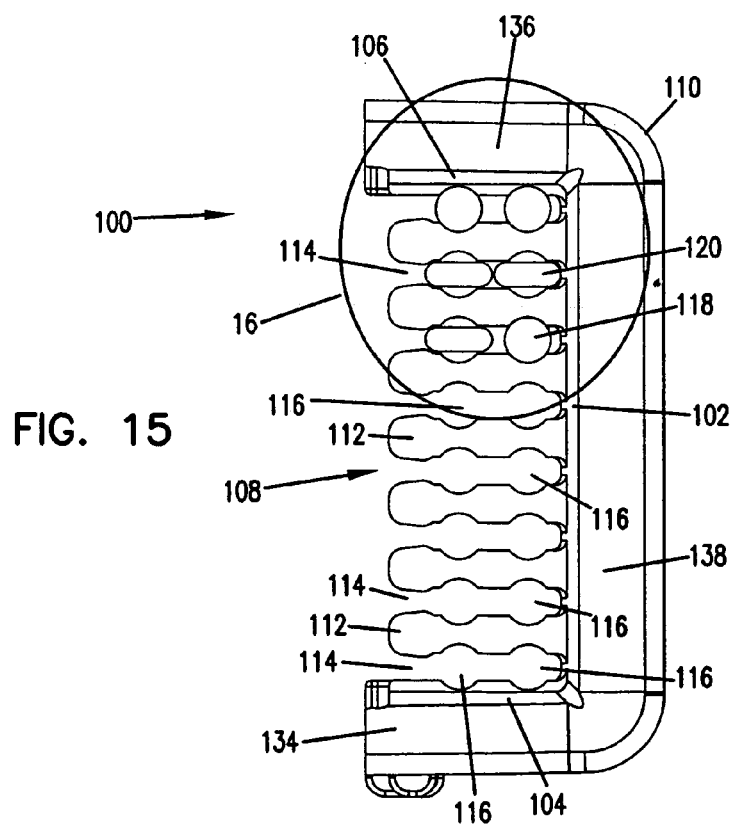
FIG. 15 is a front view of the cable clip and segregator of FIG. 11.
Figure 14:
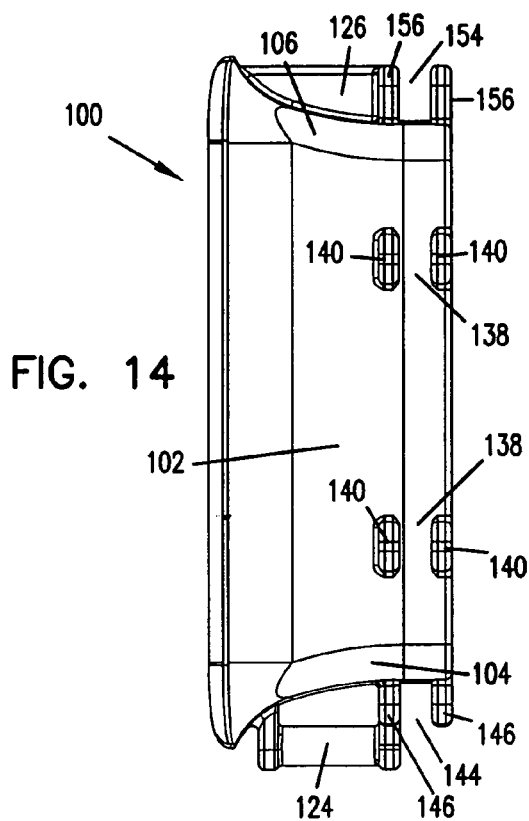
FIG. 14 is a side view of the cable clip and segregator of FIG. 11.
Figure 12:
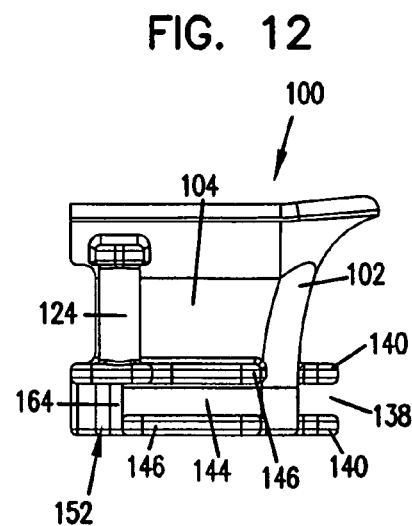
FIG. 12 is a bottom view of the cable clip and segregator of FIG. 11.
Figure 13:
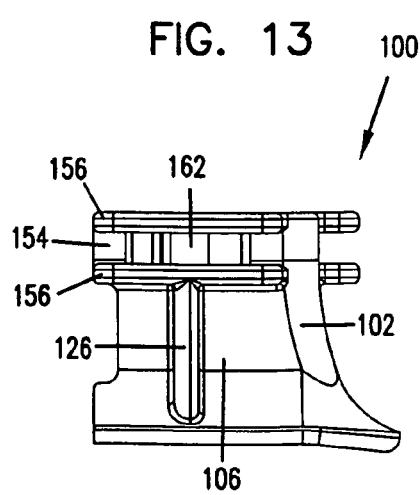
FIG. 13 is a top view of the cable clip and segregator of FIG. 11.
Figure 18:
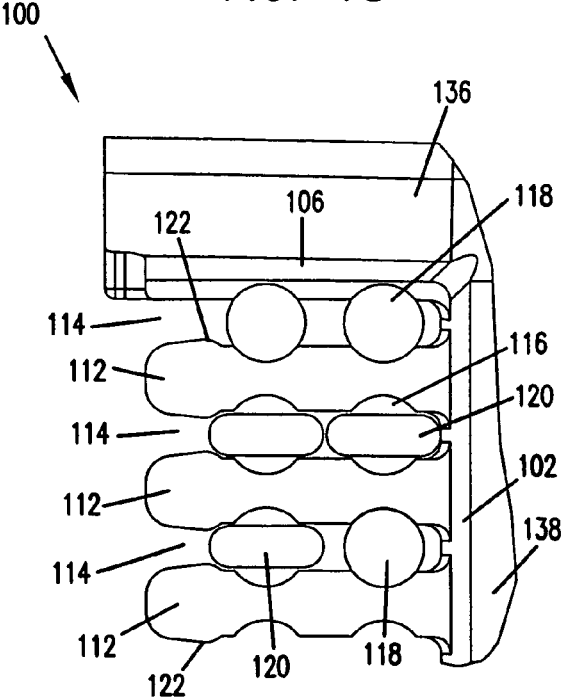
FIG. 18 is a detail view of the cable clip and segregator of FIG. 111, showing the area enclosed by circle 16 in FIG. 15.
Figure 17:
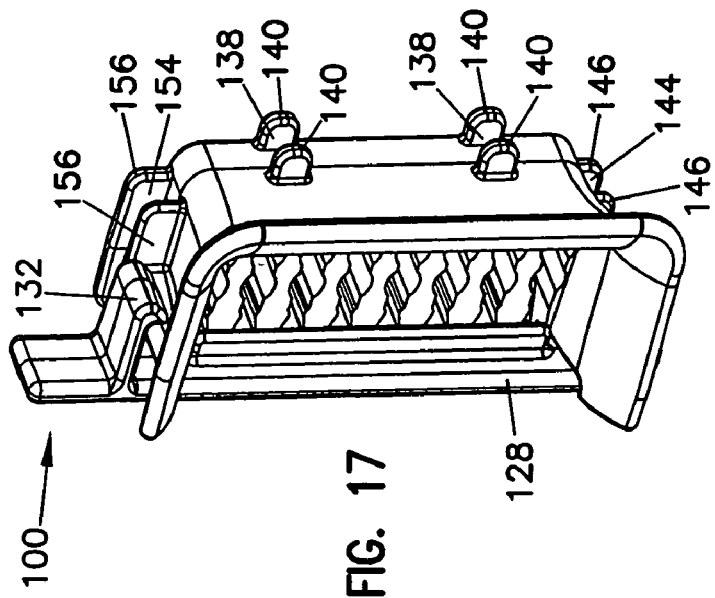
FIG. 17 is a front view of the cable clip and segregator shown in FIG. 16 with the gate in a closed position.
Figure 16:
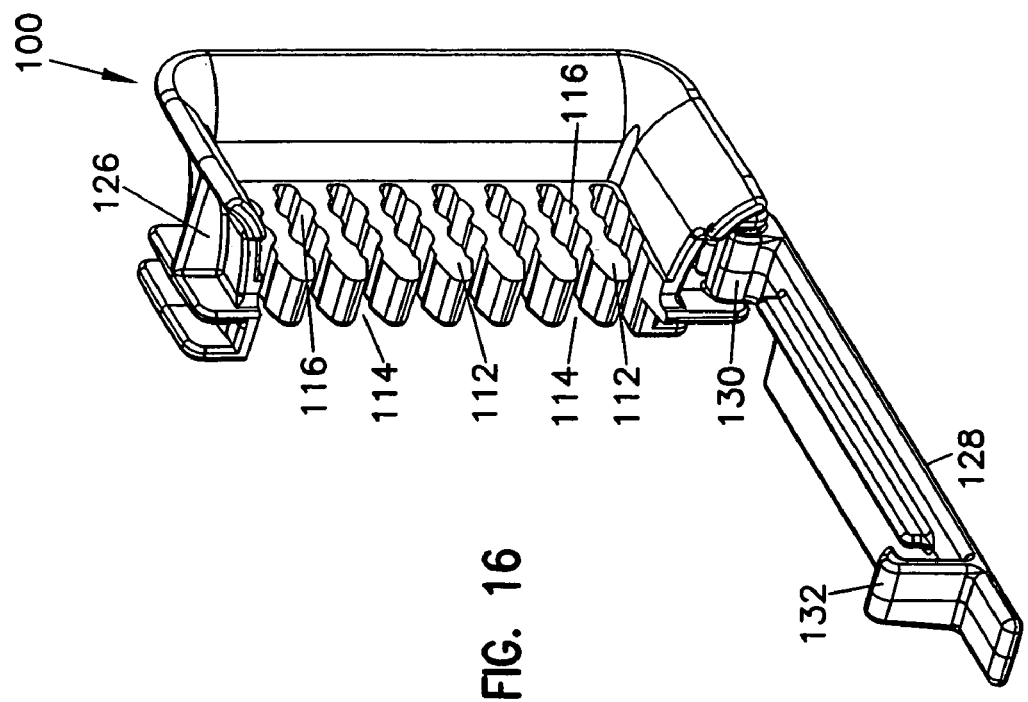
FIG. 16 is a front perspective view of an alternative embodiment of a cable clip and segregator with a gate shown in an open position.

Referring now to FIGS. 11 through 19, the details of a further cable clip 100 with cable segregator 101 are shown. Clip 100 is useful on a variety of structures, including riser 200, for managing cables, as will be discussed below in greater detail. Clip 100 includes a side 102 and two ends, 104 and 106. Side 102 and ends 104 and 106 combine to form an open sided housing 110 defining an area 108 within the housing. Into area 108 extend a series of fingers 112 from side 102, which define a series of cable slots 114 between them. A slot 114 is also defined between a finger 112 and end 104 and a finger 112 and end 106. As shown in the FIGS. a total of seven fingers 112 cooperate with ends 104 and 106 to form a total of eight cable slots 114. Each cable slot 114 includes a pair of widened cable holding openings 116, giving clip 100 a capacity of sixteen cables. Cable slots 114 are sized so that a ribbon optical fiber cable 120 can be inserted as shown in FIGS. 15 and 16. Preferably, openings 116 are also sized and shaped to hold a round 3 mm optical fiber cable 118. While slots 114 are smaller in width than the diameter of cable 118, clip 100 is made of a resilient, deformable material which, in cooperation with the cover of cable 118 will permit slots 114 to expand enough to permit the insertion of cable 118. To prevent ribbon cable 120 from accidentally escaping from slot 114, lip 122 on finger 112 provides an entrance to slot 114 which is slightly narrower than the width of cable 120. To further prevent accidental escape of cables from slots 114, a gate pivot 124 and a gate latch 126 are provided, as shown in FIGS. 16 and 17. A gate 128 with a hinge 130 that pivots about pivot 124 and a catch 132 which releasably latches to latch 126 and which is made of a deformable, resilient material and which extends along the ends of fingers 112 to close off slots 114, will serve prevent accidental cable escape.

Figure 18A:
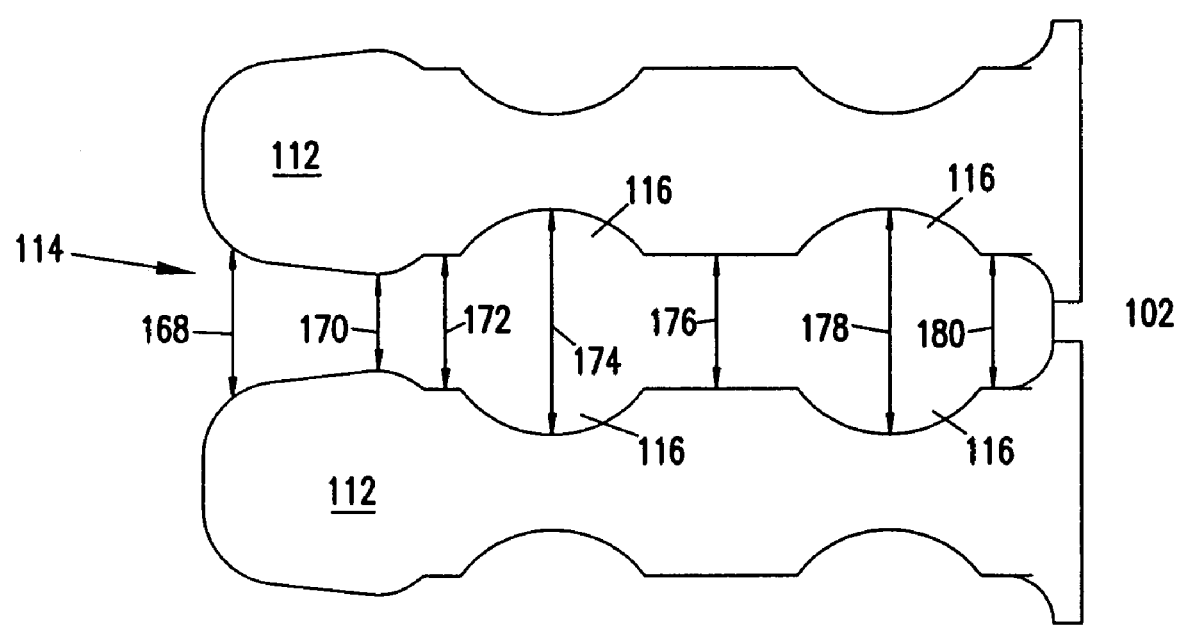
FIG. 18A is a detail view of a cable slot of the cable clip and segregator of FIG. 11.

FIG. 18A shows slots 114 in more detail. Within slot 114 are regions of varying width. Beginning at the open end of slot 114, opposite side 102, a width 168 provides an entry for cables being inserted into slot 114. Moving toward side 102, the width of slot 114 then tapers to width 170, defined by the separation of opposing lips 122. Continuing toward side 102, the width expands to a nominal width 172. Slot 114 then includes opposing openings 116, defining an expanded width 174. Continuing again in the direction of side 102, the slot returns to a nominal width 176 before expanding again with opposing openings 116 defining an expanded width 178. Between the last set of opposed openings 166 and side 102, slot 114 returns to a nominal width 180

Also included as part of housing 110 may be trumpet flares 134, 136 and 138 extending from end 104, end 106 and side 102, respectively. These trumpet flares serve as radius protection devices for cables 118 and 120 extending through slots 114 if the cables are required to change direction after they pass through slots 114.

Figure 19:
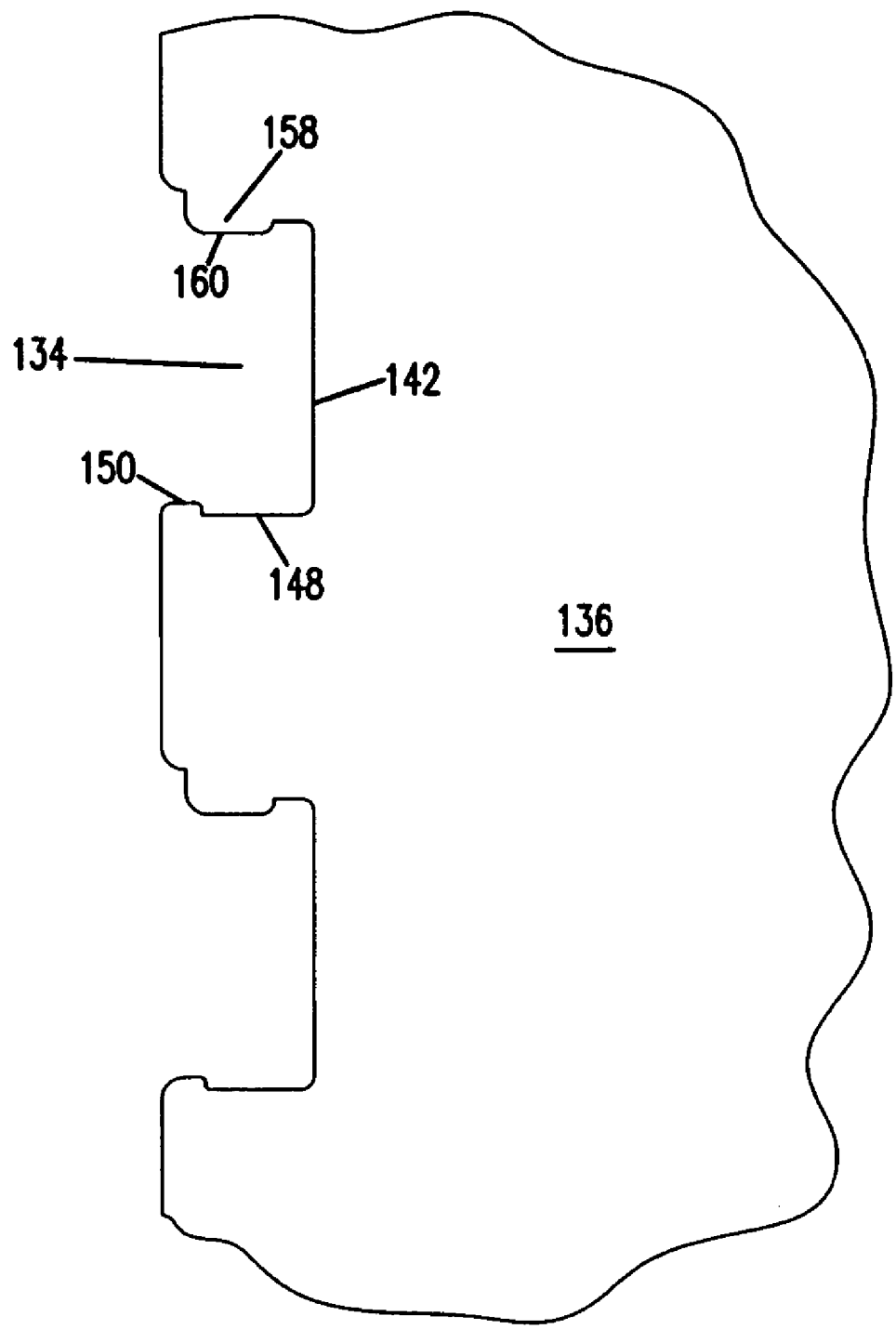
FIG. 19 is a profile of two mounting cutouts in a riser wall for mounting the cable clip and segregator of FIG. 11.
Figure 20:
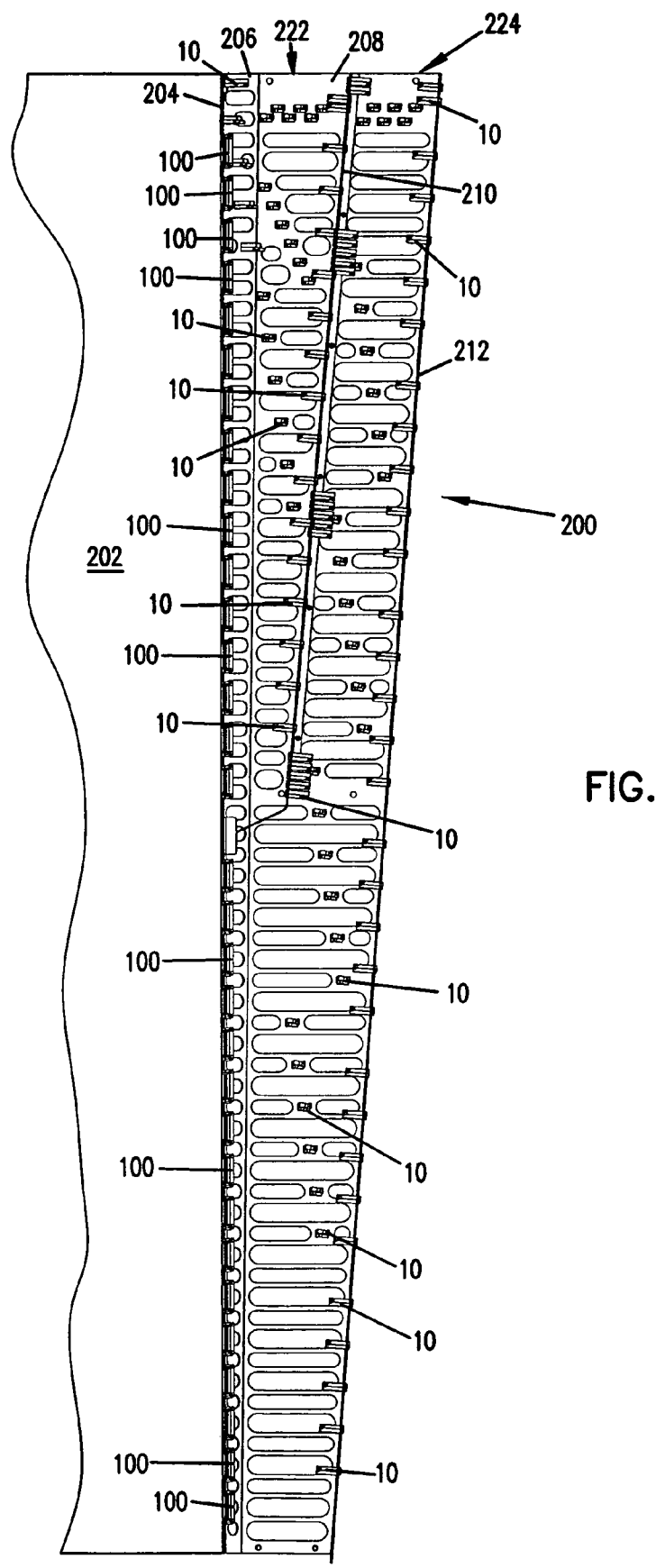
FIG. 20 is a front view of a cable riser according the present invention mounted to the side of a telecommunications equipment rack.

Clip 100 is adapted for mounting on a wall of a telecommunications equipment rack or to the wall of a cable riser attached to such a rack. This sort of installation is also shown in FIGS. 20 through 23, described below. FIG. 19 shows the shape of a cutout 134 in cable riser wall 136 in which a clip 100 could be mounted. A rear groove 138 in clip 100 is defined by pairs of rear tabs 140 for receiving a rear edge 142 of cutout 134. A lower groove 144 is defined by a pair of walls 146 receives a lower edge 148 of cutout 134, and a lower recess 152 with an end wall 164 is provided at the front end of groove 144 to receive a lower tab 150. An upper groove 154 is defined by a pair of walls 156 receives an upper edge 158 of cutout 134. From upper edge 158 extends an upper tab 160 which is received in an upper recess 162 formed in the bottom of upper groove 154. To mount a clip 100 to a wall 136 in a cutout 134, the following procedure is used: open gate 130; holding clip 100 so that rear groove 138 is parallel to wall 136, angle end 106 of clip 100 into cutout 134 so that upper edge 158 and upper tab 160 engage upper groove 154 and upper recess 162; apply pressure to ends 104 and 106 of clip 100 to slightly deform the ends toward each other; pivot lower end 104 into cutout 134 so that lower edge 148 and rear edge 142 are engaged by lower groove 144 and rear groove 138, respectively; with clip 100 still slightly deformed by pressure on ends 104 and 106, lower tab will move past end wall 164 and into recess 152; and releasing the pressure on ends 104 and 106 to allow clip 100 to regain its default shape and have end wall 164 engage lower tab 150 to hold clip 100 within cutout 134.

Figure 21:
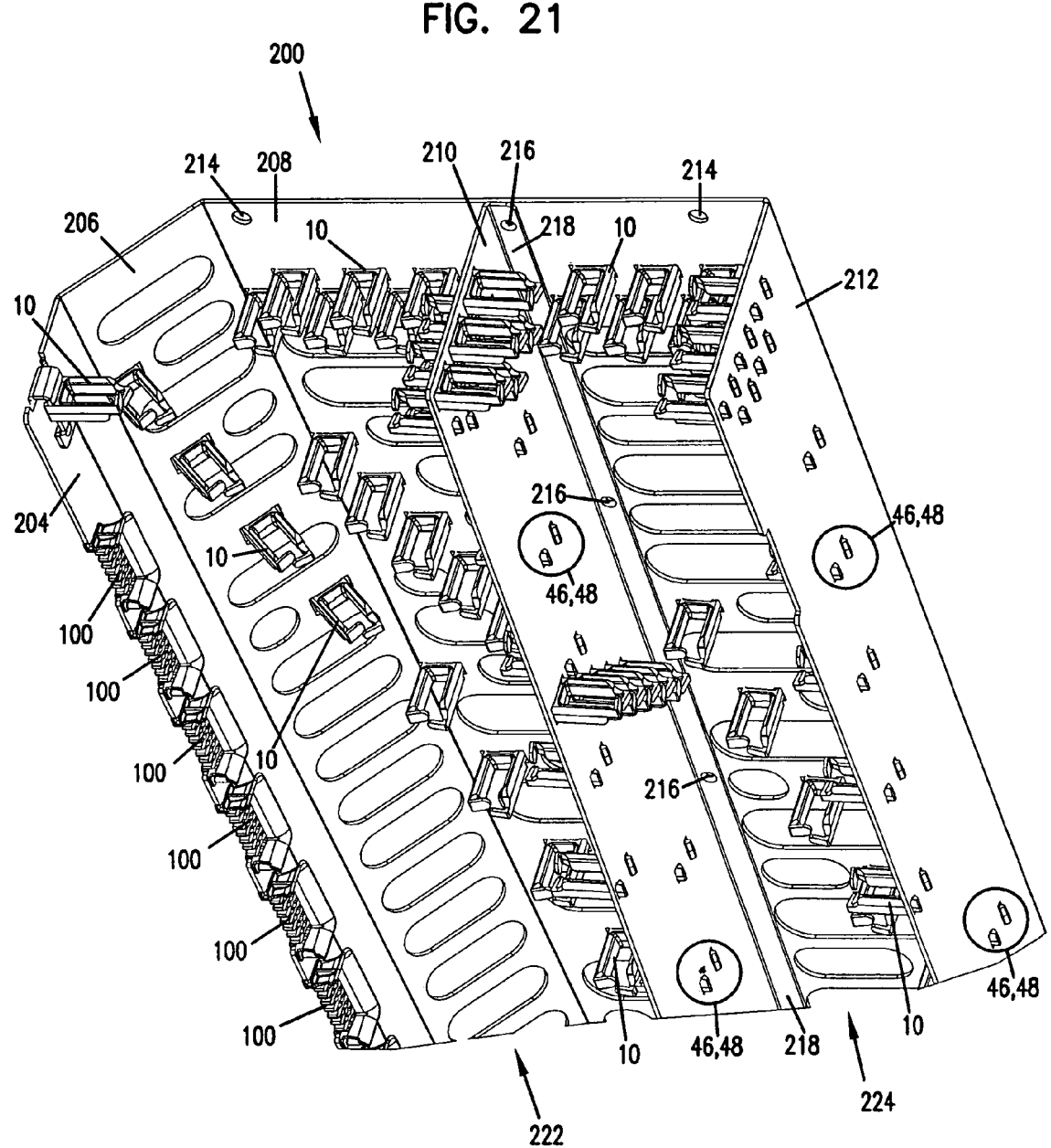
FIG. 21 is a top perspective view of the cable riser of FIG. 20 with the 32 individual cable paths indicated.
Figure 22:
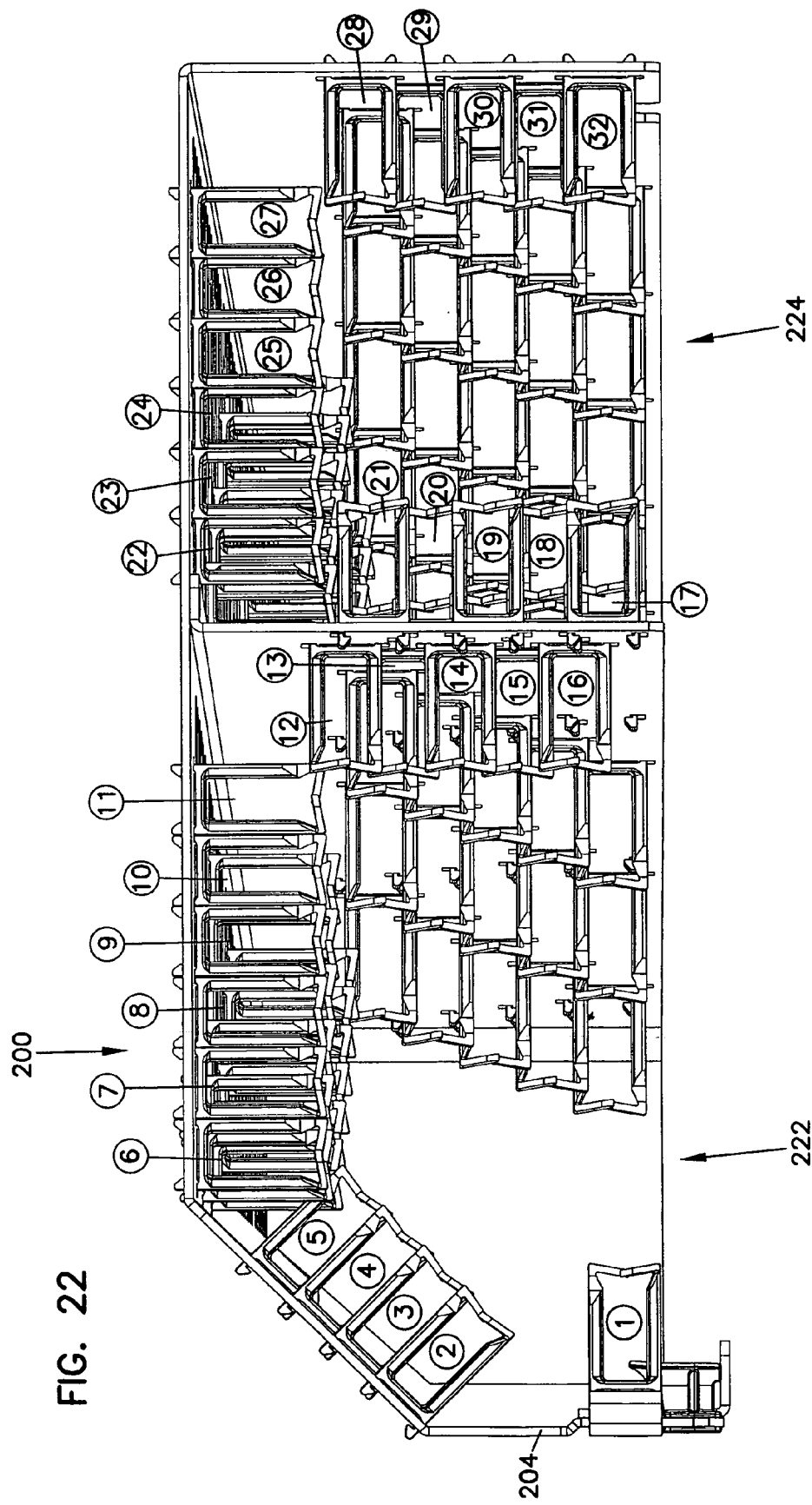
FIG. 22 is a close-up perspective view of the top of the cable riser of FIG. 20.
Figure 23:
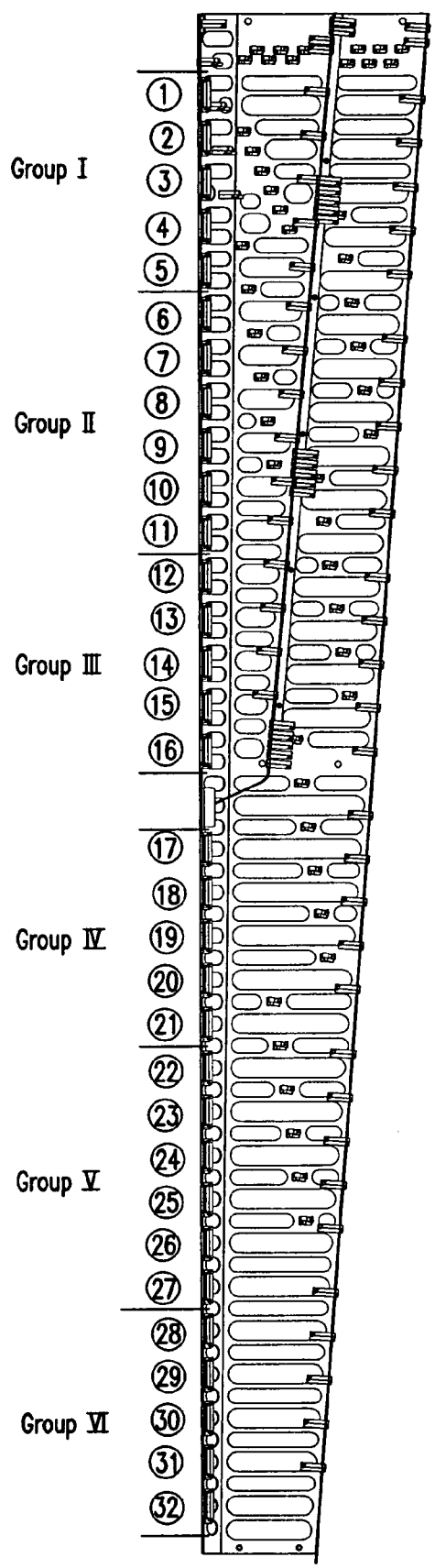
FIG. 23 is a front view of the cable riser of FIG. 20 with the cable clips and segregators 100 numbered and the six groups of clips 100 indicated.
Figure 24:
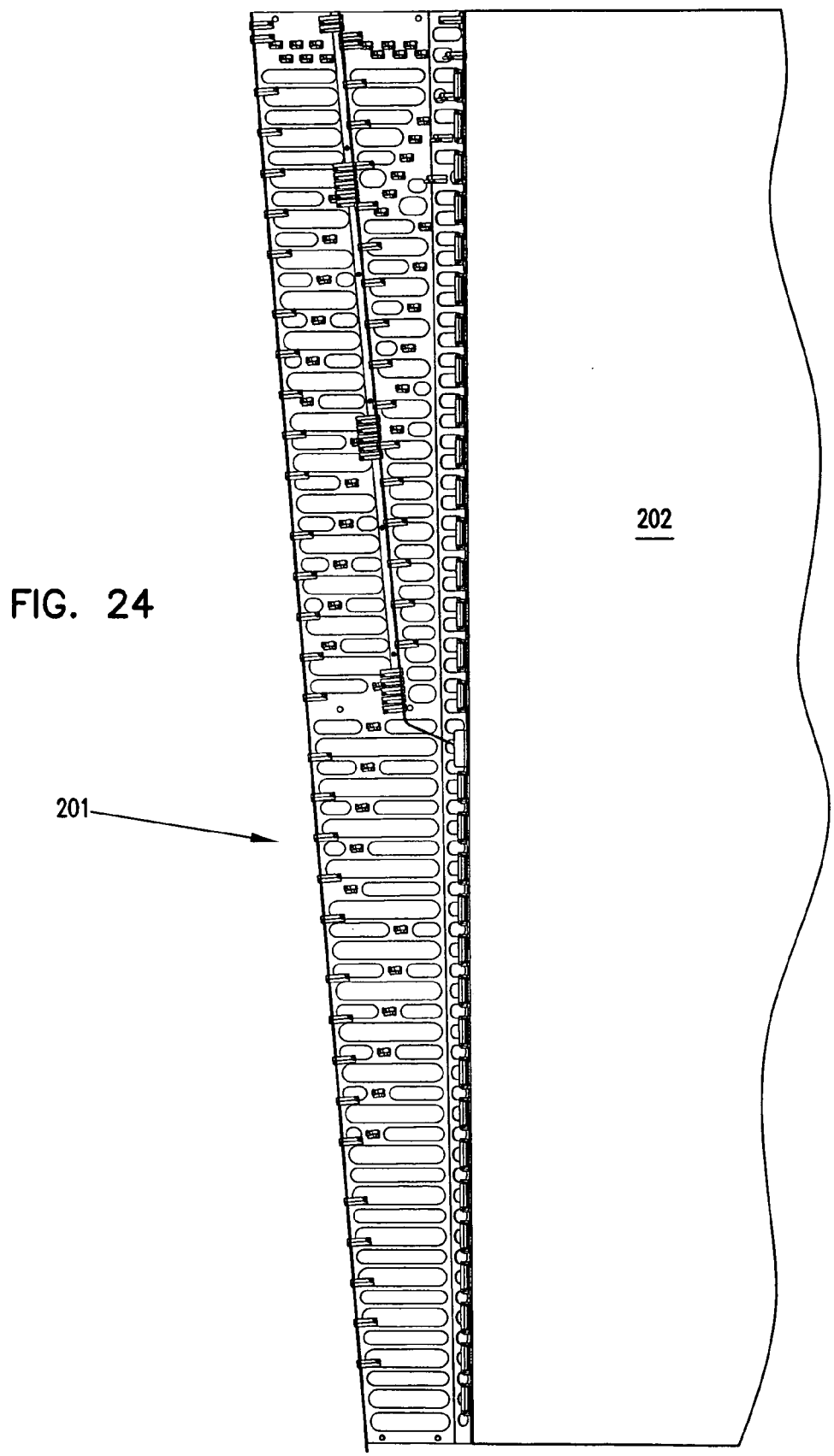
FIG. 24 is a front view of alternative embodiment of a cable riser according to the present invention.

Referring now to FIGS. 20 through 25, a cable riser 200 with cable routing clips 10 and cable clips 100 with segregators 101 is shown. Riser 200 is attached to a telecommunications equipment rack 202, in which may be mounted a wide variety of telecommunications equipment which have a large number of ribbon cables 120 or 3 mm cables 118 attached to them. Riser 200 as shown is designed to work with a equipment rack 202 containing a total of 32 cable connection modules, with each module including up to 16 optical fiber connections and having up to 16 optical fiber cables exiting from each module into riser 200. A clip 100 is provided along an inner wall 204 of riser 200 for each module in rack 202. The trumpet flares of these clips 100 serve to provide bend radius protection to the cables exiting rack 202 through clips 100 into riser 200 as these cables transition from horizontal passage within rack 202 to vertical passage within riser 200. Riser 200 is composed of inner wall 204, a rear angle wall 206, a rear wall 208, an intermediate bulkhead 210 and an outer wall 212. In FIG. 21, mounting tabs 46 and 48 of clips 10 can be seen extending through bulkhead 210 and outer wall 212. A series of holes 214 through rear wall 208 allow riser 200 to be mounted adjacent a rack 202 using screws or other similar fasteners. A series of holes 216 through flange 218 of bulkhead 210 and also extending through rear wall 208 allow bulkhead 210 to be mounted within riser 200 using screws, bolts or similar fasteners. As shown in FIG. 24, riser 201 is a mirror image of riser 200 for mounting on the opposite side of rack 202.

Clips 10 are mounted within riser 200 so as to provide a distinct cable path 220 to each set of up to 16 cables extending through each of the clips 100. A total of 32 cables paths 220, each capable of handling up to 16 cables are defined, as shown in FIG. 22. Each cable path 220 is indicated by a circled number associated with the top most clip 10 in that cable path. The numbers for each cable path correspond to numbers assigned to each clip 100, with the topmost clip 100 labeled 1 and the bottommost clip 100 labeled 32, as shown on FIG. 23. Sixteen cable paths 220 are located within the inner channel 222, defined by inner wall 204, angled wall 206, rear wall 208, and bulkhead 210, providing cable routing and organization to cables exiting from the topmost sixteen clips 100 mounted on inner wall 204. Sixteen additional cable paths 220 are located within outer channel 224, defined by bulkhead 210, rear wall 208 and outer wall 212, providing cable routing and organization for cables exiting the bottommost sixteen clips 100 mounted on inner wall 204.

Figure 25:
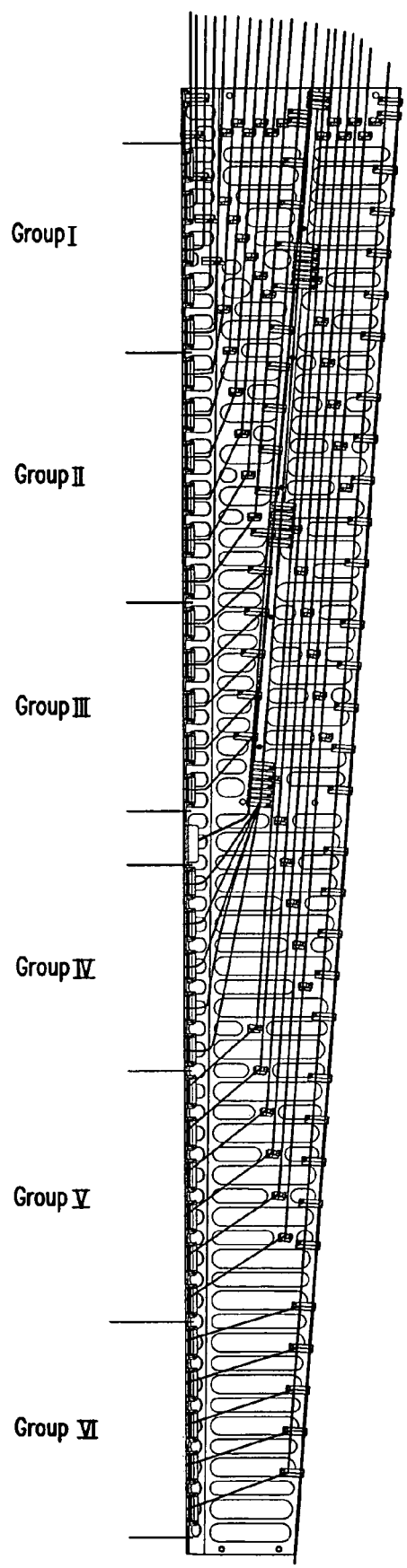
FIG. 25 is a front view of the cable riser of FIG. 20 showing cable loading according to the present invention.
Figure 26:
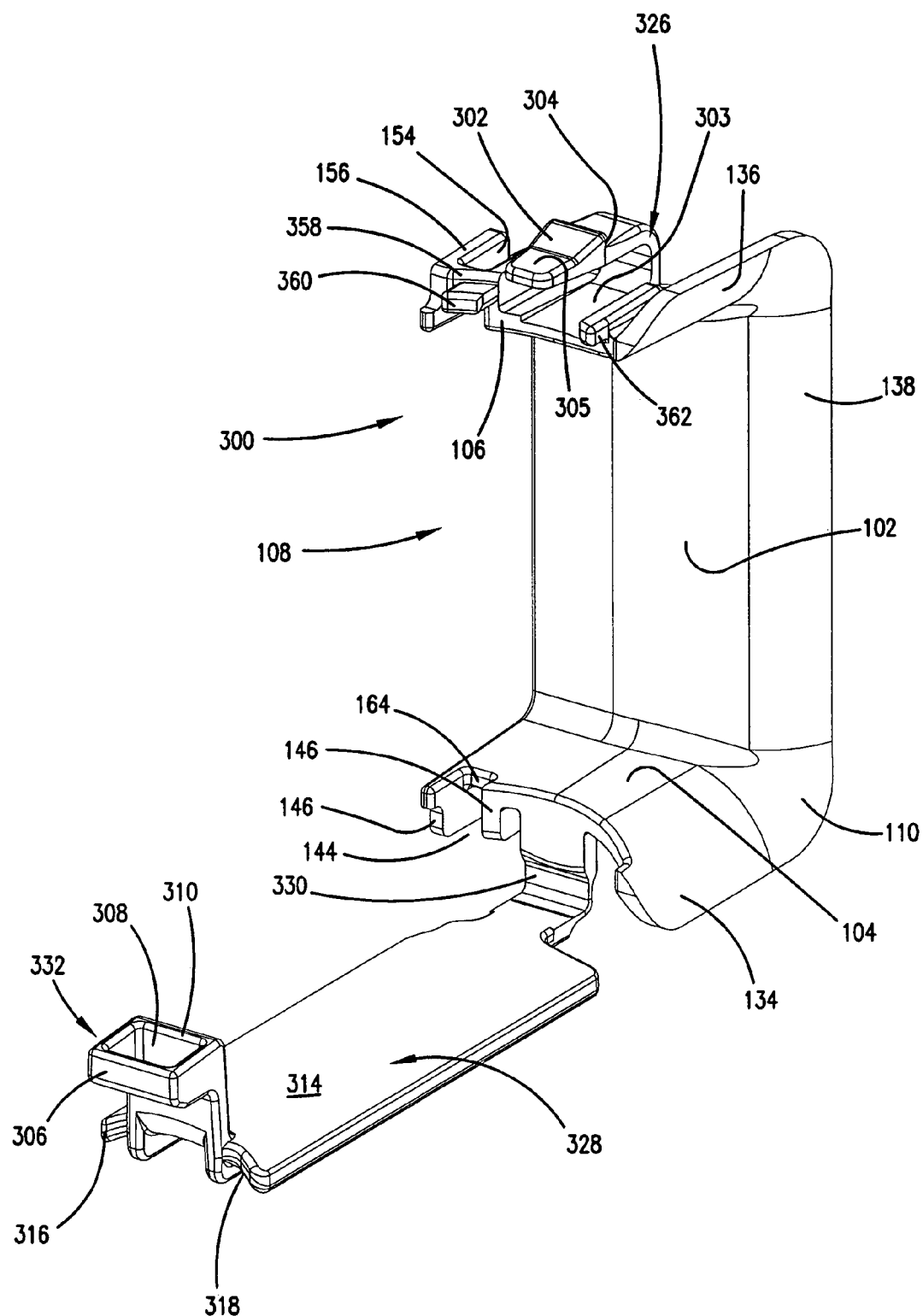
FIG. 26 is a front perspective view of an alternative embodiment of a cable clip according to the present invention, showing the door in an open position.
Figure 32:
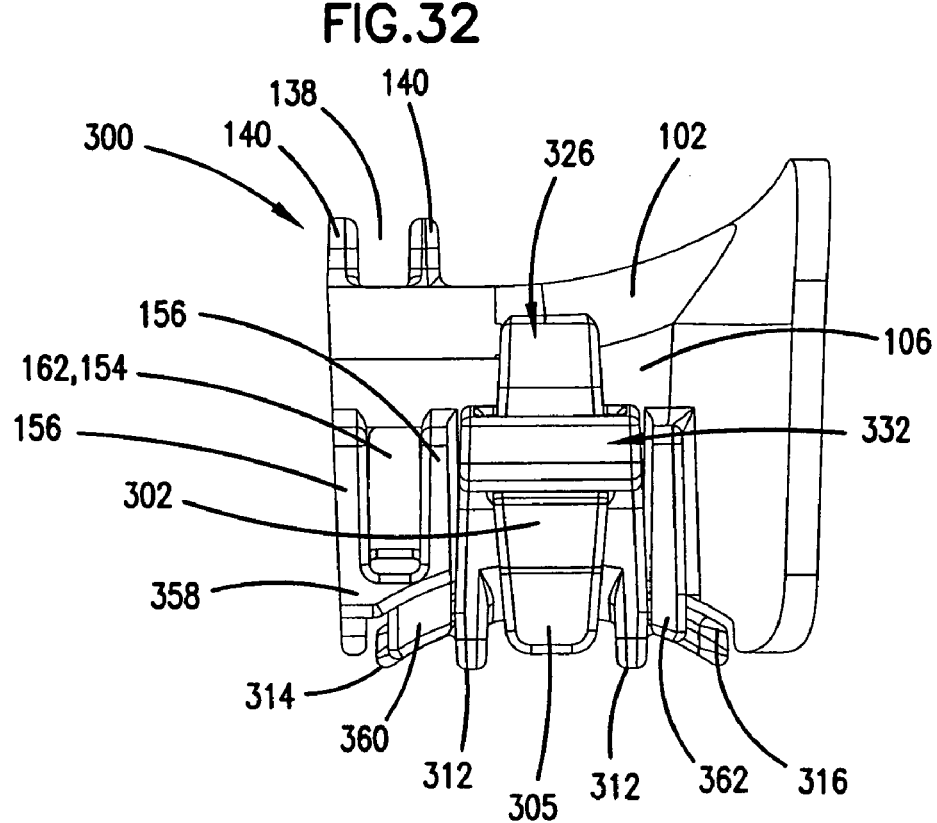
FIG. 32 is a top view of the cable clip of FIG. 27.
Figure 33:
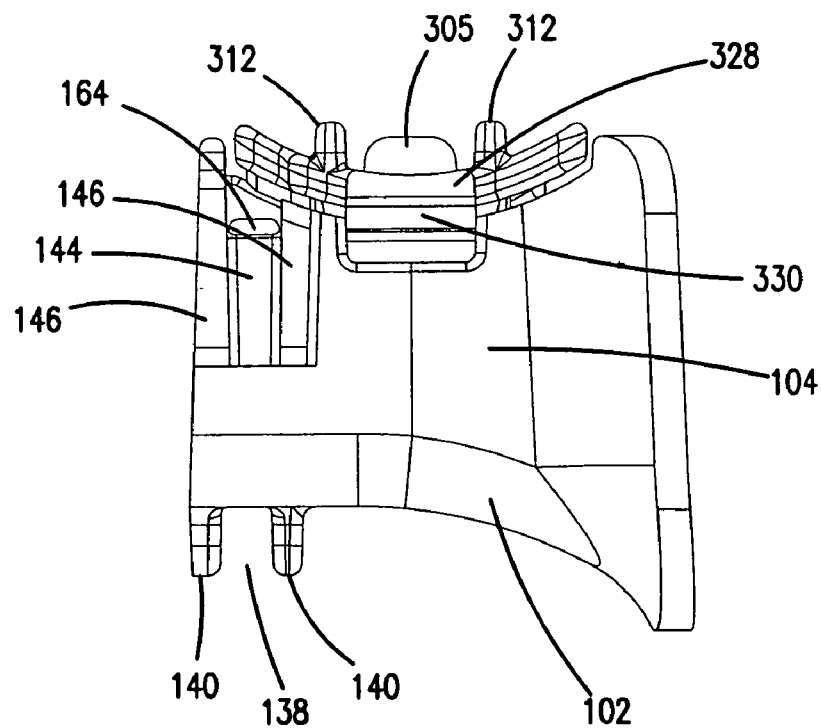
FIG. 33 is a bottom view of the cable clip of FIG. 27.

Clips 100 are in one of six groups, as shown in FIGS. 23 and 25. The groupings of clips 100 correspond to the location of the cable pathway for each clip 100 as defined by clips 10 mounted in riser 200. The first five clips 100, numbered 1 through 5, are in Group I and cables exiting from this group of clips feed into paths 220 numbered 1 through 5, which are mounted on inner wall 204 and on angled wall 206. Group II includes the next 6 clips 100, numbered 6 through 11, and the cables from these clips feed into paths 220 numbered 6 through 1, which are mounted on rear wall 208 within inner channel 222. Group III includes the clips 100 numbered 12 through 16 and cables from these clips feed into paths 220 numbered 12 through 16, which are mounted on bulkhead 210 within inner channel 222. Group IV includes clips 100 numbered 17 through 21 and cables from the clips feed into paths 220 numbered 17 through 21 mounted on bulkhead 210 within outer channel 224. Group V includes clips 100 numbered 22 through 27 and cables from the clips feed into paths 220 numbered 22 through 27 mounted on rear wall 208 within outer channel 224. Group VI includes clips 100 numbered 28 through 32 and cables from the clips feed into paths 220 numbered 28 through 32 mounted on outer wall 212 within outer channel 224.

The pattern for loading cable would generally be counter clockwise for a riser 200 and clockwise for a riser 201. As shown in the FIGS. path 220 numbered 32 will hold the cables from clip 100 numbered 32. Clip 100 numbered 32 is the lowest mounted clip 100 in riser 200 and path 220 numbered 32 is the furthest clockwise-located path 220 in riser 200. Clip 100 numbered 31 is the next lowest mounted clip 100 and the cable from this clip will be held within path 220 numbered 31, located counterclockwise from path 220 numbered 32 within outer channel 224 of riser 200. Moving to the next highest mounted clip 100, up to clip 100 numbered 17, the cables from each successive numbered clip will be held by the next counterclockwise located cable path within outer channel 224. Moving up to clip 100 numbered 16, the cables from this clip will pass into most clockwise mounted path 220 numbered 16 within inner channel 222. Moving up to clip 100 numbered 15, the cables from this clip will be held by the next counterclockwise mounted path 220 numbered 15. Moving to the next highest mounted clip 100, up to clip 100 numbered 1, the cables from each successive numbered clip will be held by the next counterclockwise located cable path within inner channel 222. The same cable loading pattern can be applied within riser 201, except that the cables from each successive higher mounted clip 100 feeding into a particular channel will be held by the next successive clockwise mounted path 220.

With the potential of 512 total cables passing through riser 200, some manner of coding the clips 10 which combine to make up the 32 different paths 220 is desirable. The maximum number of paths 220 within each group of clips 100 is six. Therefore, if six distinctly marked or colored versions of clip 10 are provided, each path 220 within riser 200 can be uniquely identified by a combination of color or marking, designation of inner or outer channel, and which wall within the channel the clips are mounted on. For example, a series of black clips 10 along outer wall 212 in the outer channel 224 would define path 220 for routing the cables from clip 100 numbered 28. White clips 10 along bulkhead 210 in inner channel 222 would define path 220 for routing cables from clip 100 numbered 15. Alternatively, indicia signifying which path 220 a clip 10 belongs to could be placed on front face 40, first outer face 20 or second outer face 22, depending on how the clip is mounted within the riser, so that the indicia could be easily seen by a person in front of the riser.

If higher densities of cabling are required for a particular telecommunications equipment rack, riser 200 could include more than one intermediate bulkhead 210 and thereby provide a greater number of channels and thereby of cable paths 220. Alternatively, if the density of cabling for an equipment rack is not as high, bulkhead 210 could be removed from riser 200 and the number of paths 220 reduced. The coding scheme for clips 10 described above is adaptable to both higher and lower density alternatives of riser 200.

Referring now to FIGS. 26 through 33, an alternative embodiment cable clip 300 is shown, without a segregator extending from side 102 into area 108. Clip 300 includes a gate 328 connected to housing 110 by a thinned area capable of being repeatedly flexed, forming a living hinge 330. Gate 328 includes a curved inner surface 314 and a pair of outer stiffening ribs 312, which cooperate to resist deflection of gate 328. At an end of gate 328 opposite hinge 330 is a catch 332 which includes an outer wall 306 and an inner wall 310 which define an opening 308. Opening 308 receives a latch 326 which is on end 106 of housing 110. Latch 326 includes a ramped surface 302, a ledge 304 and a leading edge 305. As gate 328 is swung closed across opening 108, pivoting about hinge 330, leading edge 305 enters opening 308. As gate 328 is closed further, ramped surface 302 engages outer wall 306 of catch 332, deflecting catch 332 downward. Ramped surface 302 passes through opening 108 followed by ledge 304. When ledge 304 has extended through opening 108 beyond outer wall 306, latch 332 returns to its original position and ledge 304 is captively held within opening 308 by outer wall 306, releasably holding gate 328 in a closed position.

While in the closed position, inner wall 310 of gate 328 is adjacent a surface 303 on end 106 beneath catch 326. In addition, outer shoulders 316 and 318 located on the end of gate 328 opposite hinge 330 on either side of catch 332, engage extensions 360 and 362, respectively, which project from end 106 away from side 102 on either side of latch 326. Inner wall 310 cooperates with surface 303, and extensions 360 and 362 cooperate with shoulders 316 and 318 to allow gate 328 to help resist deflection of end 106 into opening 108.

Figure 34:
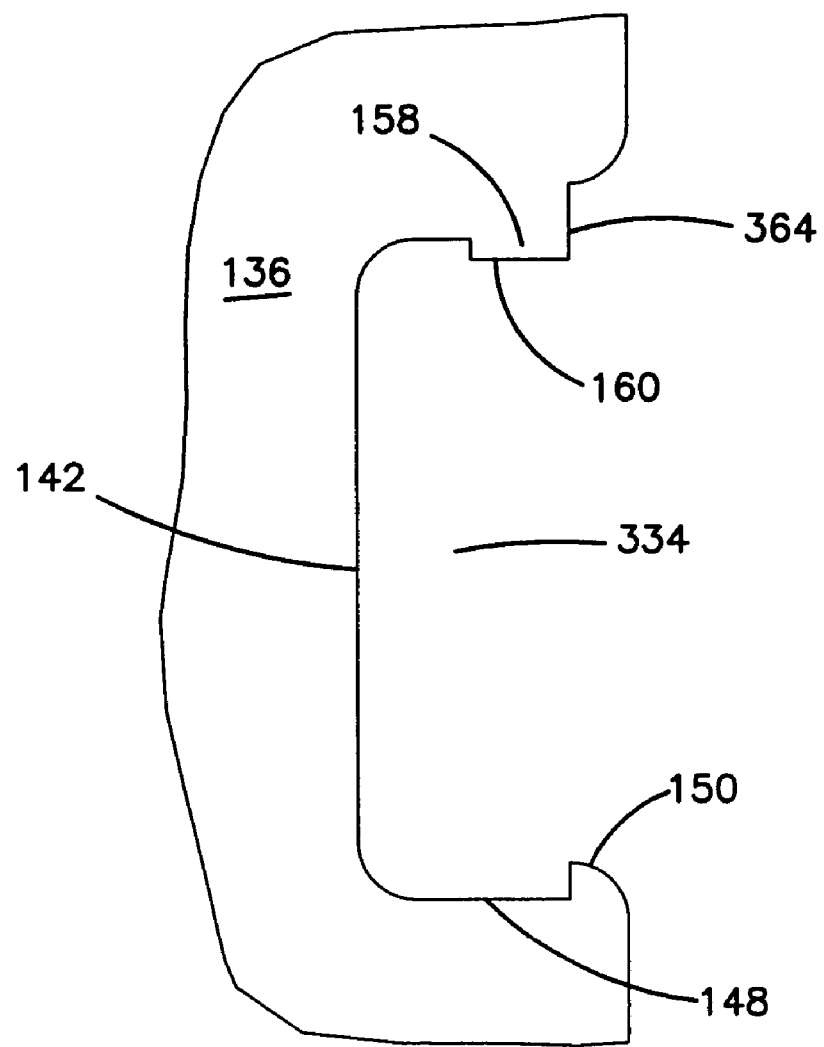
FIG. 34 is a left side view of a wall including a cutout along the edge for mounting the cable clip of FIG. 26.

FIG. 34 shows a cutout 334 for mounting clip 300 to wall 136. To position clip 300 into cutout 334, the procedure described above with regard to positioning clip 100 within cutout 134 is followed. Removal of clip 300 from cutout 334 involves a reversal of the procedure, wherein ends 104 and 106 must be compressed toward each other into area 108 to disengage upper tab 160 from upper groove 154 and opening 162. When clip 300 has been positioned within cutout 334 and gate 328 is moved to the closed position, the cooperation of inner wall 310 with surface 303 and extensions 360 and 362 with shoulders 316 and 318 allows gate 328 to provide additional resistance against deflection of ends 104 and 106. In this way, gate 328 can help prevent an accidental removal of clip 300 from cutout 334. Further, the cooperation of catch 332 and latch 326 will aid in preventing accidental opening of gate 328 that might be caused by accidental deflection of either ends 104 and 106 or of gate 328. Outer ribs 312 also help gate 328 resist deflection, such as might be caused by a cable within area 108 pressing against inner surface 314.

Figure 35:
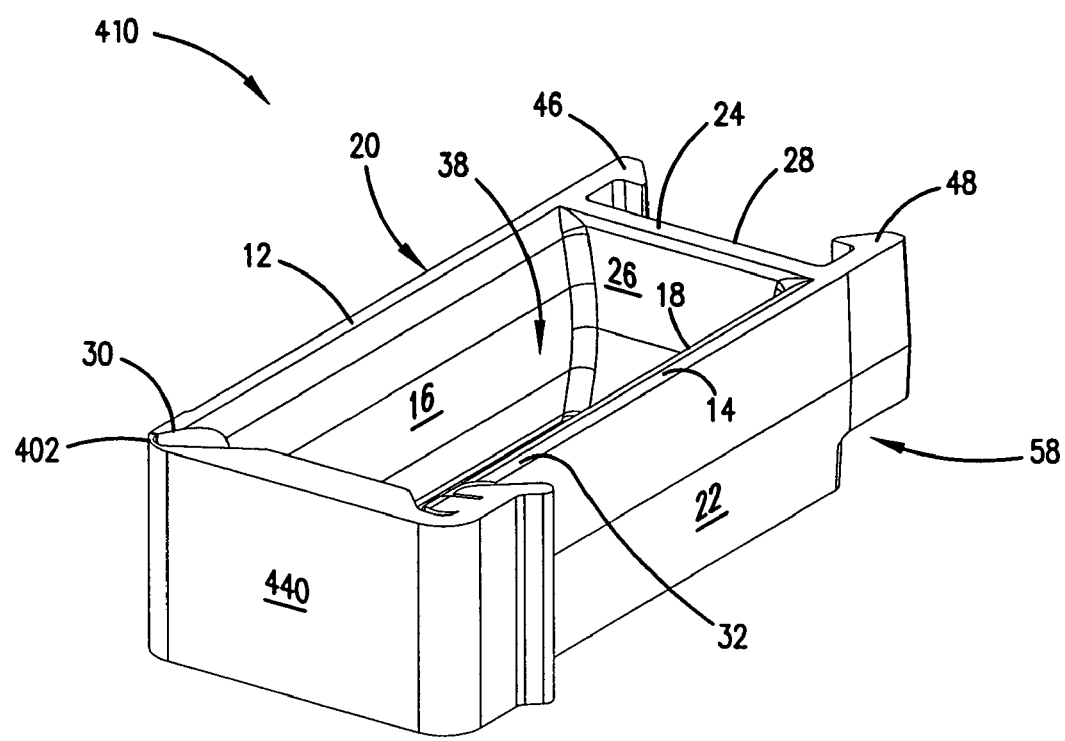
FIG. 35 is a front perspective view of an alternative embodiment of a cable routing clip according to the present invention.
Figure 36:
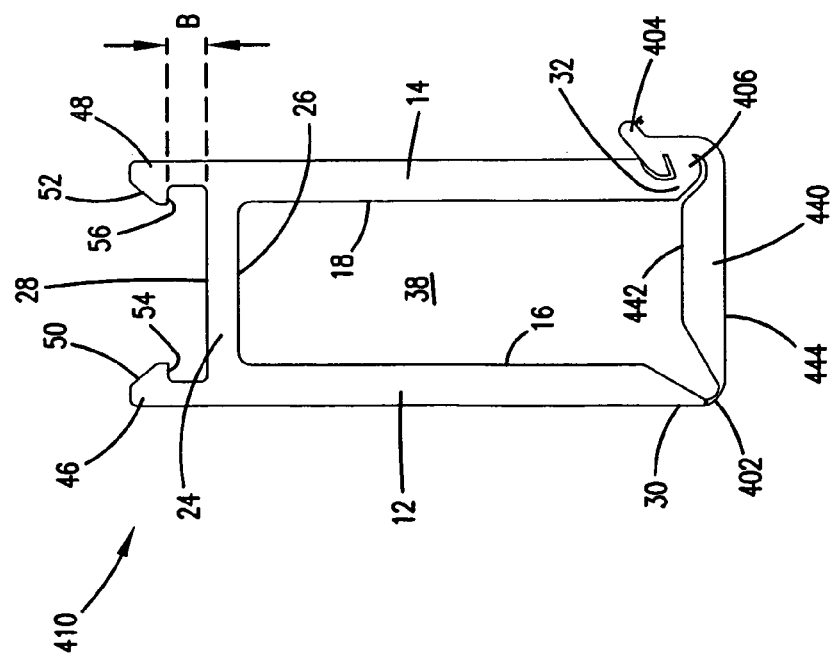
FIG. 36 is a top view of the cable routing clip of FIG. 35.
Figure 37:
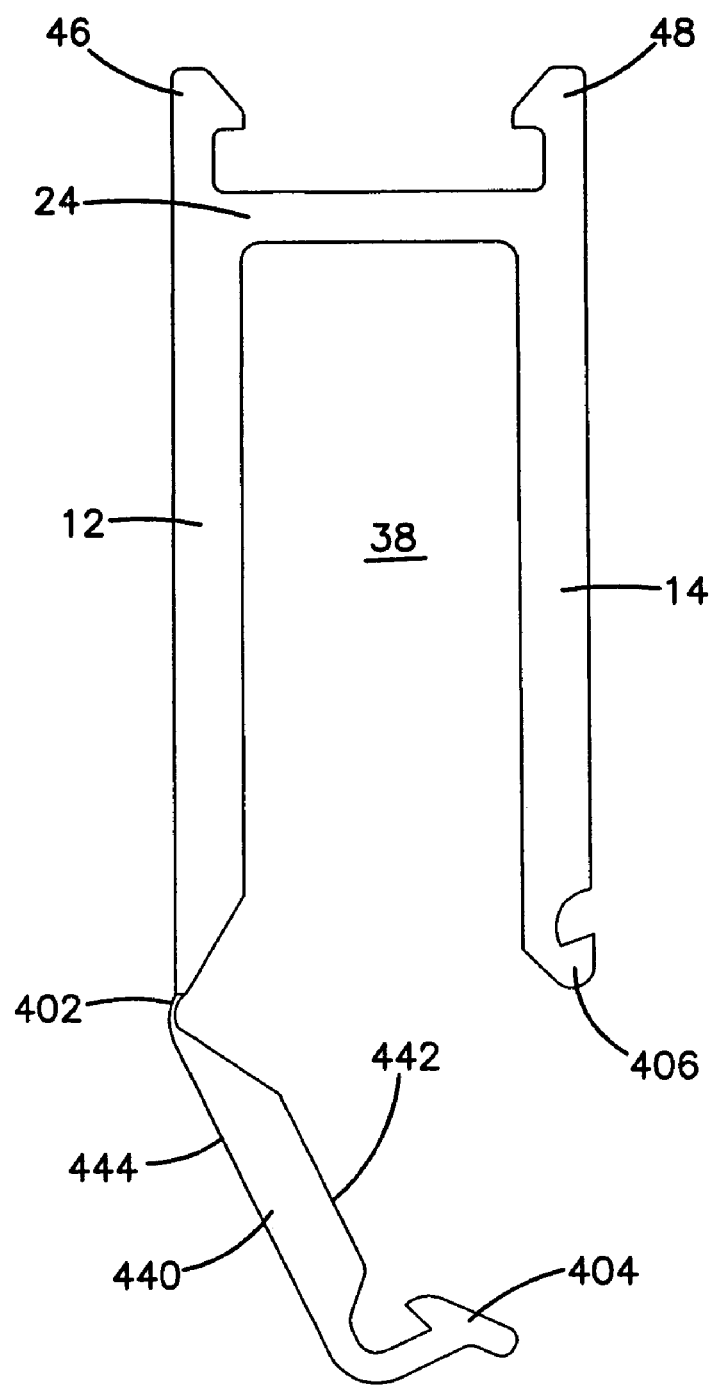
FIG. 37 is a top view of the cable routing clip of FIG. 35 with the gate closing the slot in an open position.

Referring now to FIGS. 35 through 37, an alternative embodiment cable routing clip 400 with a movable gate 440 closing access through the front into slot 38. Gate 440 is hingedly attached to distal end 30 of clip arm 12 by a living hinge 402. As shown in FIGS. 36 and 37, at distal end 32 of clip arm 14 is a catch 406 which engages a latch 404 on gate 440 to hold gate 440 in the closed position.

Figure 38:
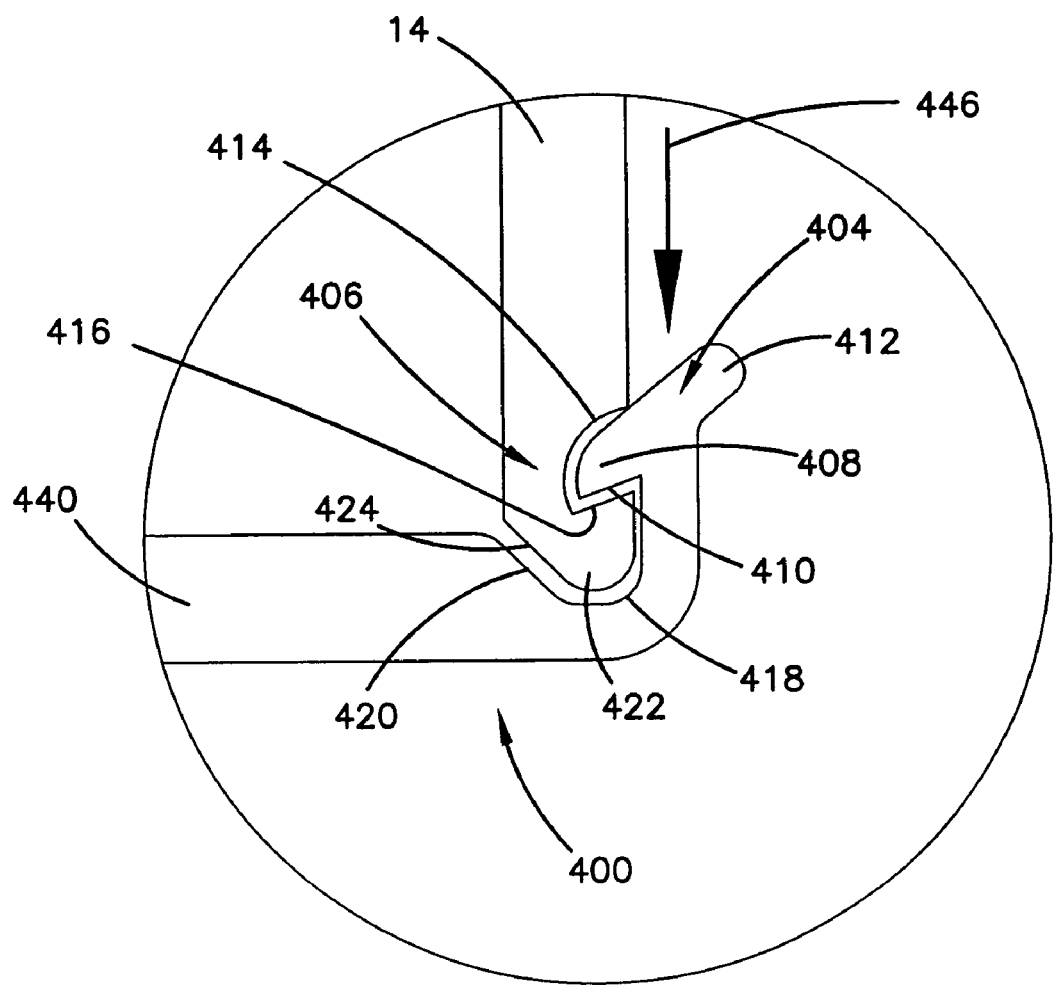
FIG. 38 is a closer top view of the cable routing clip of FIG. 36 showing further detail of the closure mechanism for the gate.

Referring now to FIG. 38, further details of gate 440, latch 404 and catch 406 are shown. Latch 404 includes an extension 408 with a ramped surface 410 and a finger tab 412. Catch 406 includes a recess 414 for receiving extension 408 which includes a ramped surface 416, an extension 422 at distal end 32 with a ramped surface 424. On gate 440 adjacent latch 404 are a recess 418 for receiving extension 422, recess 418 having a ramped surface 420.

The cooperation of latch 404 with catch 406, including the interaction of ramped surfaces 410 and 416 in cooperation with the interaction of ramped surfaces 420 and 424 help prevent gate 440 from accidentally opening due to pressure exerted on either clip arm 12 or 14, or on gate 440. Pressure exerted on inner surface 18 of clip arm 14 would tend to move extension 408 deeper into recess 414, preventing gate 440 from being forced open accidentally. Pressure exerted on an inner face 442 of gate 440 would be prevented from forcing gate 440 open by interaction of ramped surfaces 410 and 416. The angling of ramped surfaces 410 and 416 as shown in FIG. 38 also allows gate 440 to be biased to an open position, as shown in FIG. 37, and for such biasing to be resisted by catch 406 and latch 404 when gate 440 is closed. Pressure exerted against inner face 16 of clip arm 12 would tend to pull distal end 30 and living hinge 402 away from clip arm 14, which would tend to move extension 408 deeper into recess 414, preventing gate 440 from accidentally opening. So pressure exerted against any of the inner surfaces of cable routing clip 400 which might cause gate 440 to accidentally open are resisted by catch 406 and latch 404. Such pressure on the inner surfaces of cable routing clip 400 might be caused by the pulling on cables which are held within slot 38.

Catch 406 and latch 404 also are configured to resist pressure exerted against outer surfaces 20 or 22 of clip arms 12 and 14, or against an outer surface 444 of gate 440 from accidentally opening gate 440. Pressure exerted against outer surface 20 of clip 12 would push distal end 30 toward distal end 32 and tend to push extension 408 out of recess 414. However, prior to extension 408 being displaced far enough to move out of recess 414, ramped surfaces 420 and 424 would engage one another and move distal end 32 and recess 414 in the same direction as extension 408. The angling of ramped surface 420 and 424 will also tend to push recess 418 away from extension 422 and draw ramped surfaces 410 and 416 into contact with each other, which will also help prevent the disengagement of catch 406 and latch 404.

Similarly, pressure exerted on outer surface 22 of clip arm 14 will tend to displace distal end 32 toward distal end 30, which will also bring ramped surfaces 420 and 424 into contact. The interaction of ramped surfaces 420 and 424 will push recess 418 away from extension 422 and draw ramped surfaces 410 and 416 into contact with each other, which will also help prevent the disengagement of catch 406 and latch 404. Pressure exerted on outer surface 444 of gate 440 would also tend to bring ramped surfaces 420 and 424 into contact, which will in turn tend to push distal end 32 away from slot 38 and more deeply engage extension 408 within recess 414.

To release gate 440 from the closed position of FIG. 36, a user would exert pressure against finger tab 412 in the direction of an arrow 446. Since cable routing clip 400 is made of a resilient deformable material, sufficient pressure in the direction of arrow 446 will deflect extension 408 enough to remove extension 408 from recess 414 and allow gate 440 to be freely moved to the open position of FIG. 37. In moving gate 440 to the closed position shown, extension 408 of latch 404 first engages extension 422 of clip arm 14 and must deflect outward before extension 408 engages recess 414. Once extension 408 reaches recess 414, latch 404 returns to the nondeflected position, and thereby positively snaps into recess 414.

Figure 39:
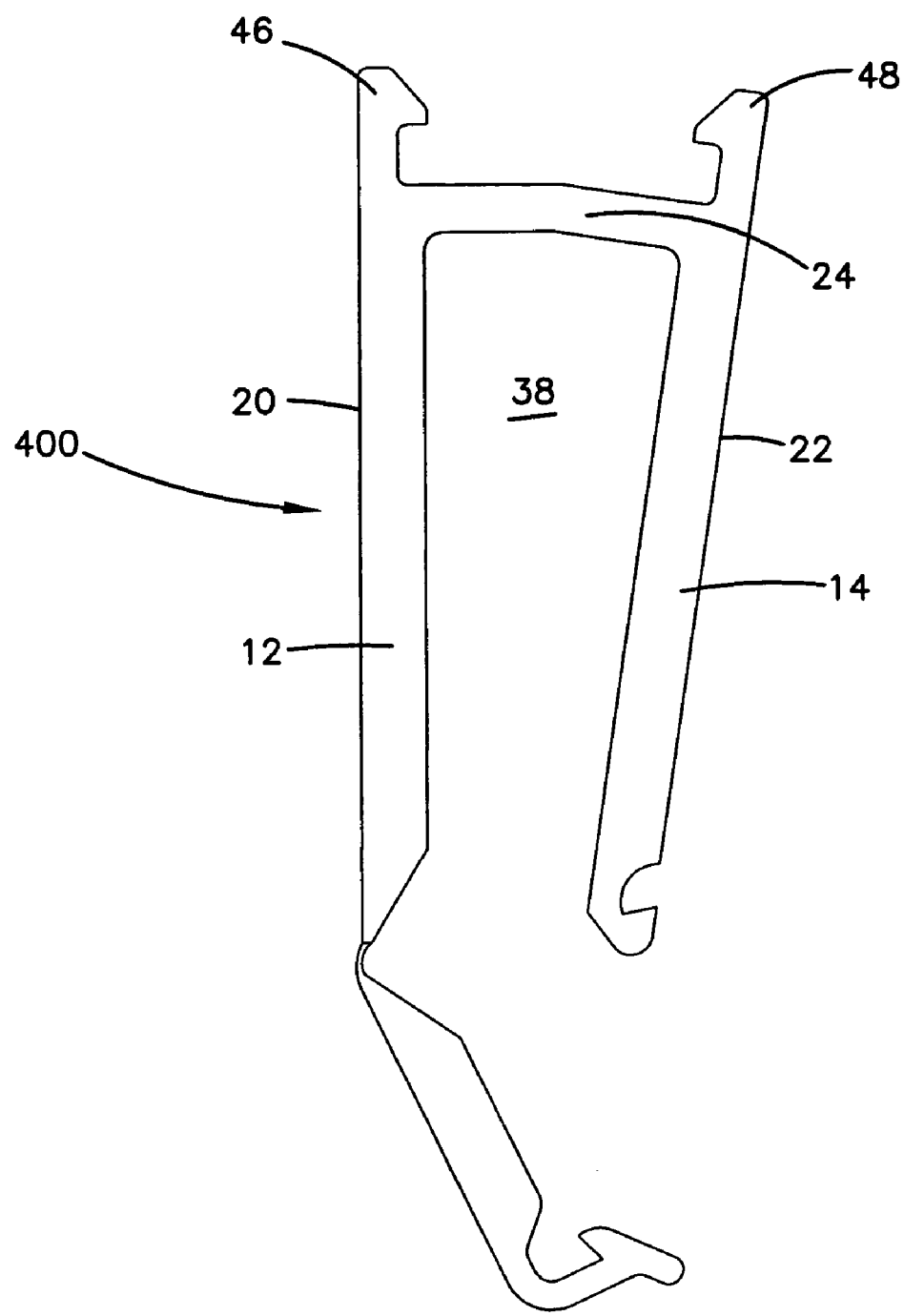
FIG. 39 is a top view of the cable routing clip of FIG. 37 with the clip arms compressed into the slot so that the mounting tabs are spread apart for insertion into mounting slots in a wall.
Figure 41:
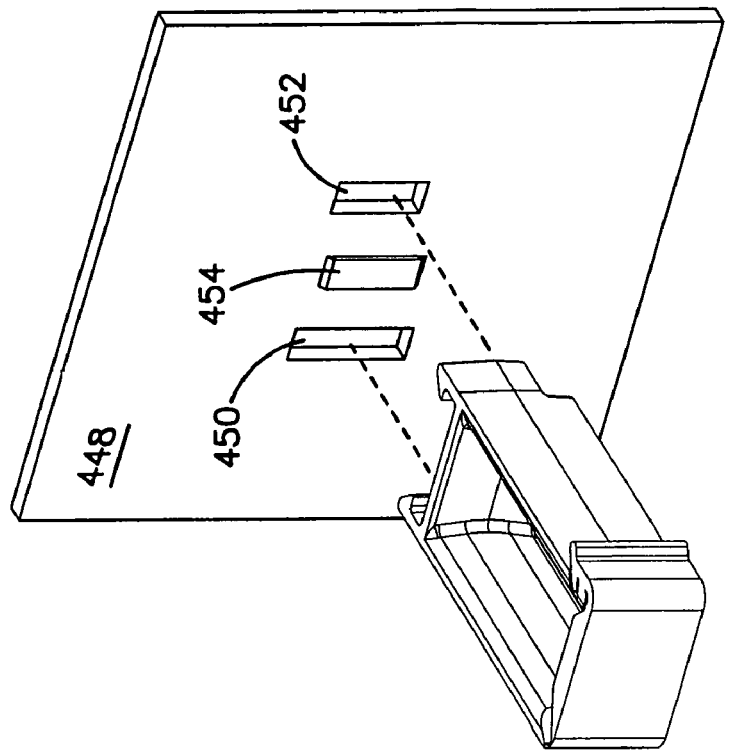
FIG. 41 is a front perspective exploded view of the cable routing clip of FIG. 40 mounted to a wall.
Figure 40:
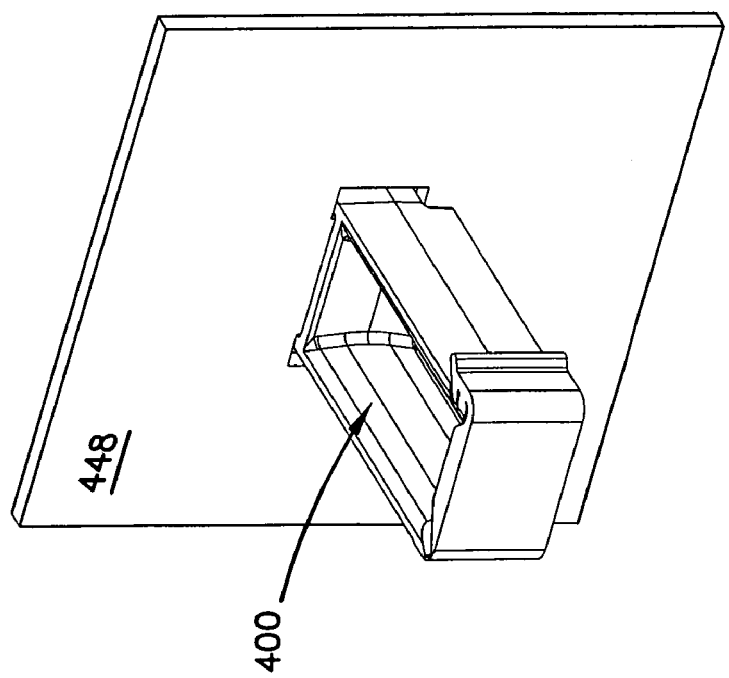
FIG. 40 is a front perspective view of the cable routing clip of FIG. 35 mounted to a wall.

As an alternative mounting method to that described above with regard to cable routing clip 10, cable routing clip 400 may be mounted to a wall 448, as shown in FIG. 40, with the following steps: placing gate 440 in an open position, as shown in FIG. 37; exerting pressure on outer surfaces 20 and 22 of clip arms 12 and 14, causing clip arms 12 and 14 to be displaced into slot 38 toward each other, as shown in FIG. 39; this in turn will force some bending of crosspiece 24 and displace tabs 46 and 48 away from each other; tabs 46 and 48 are inserted into tab slots 450 and 452, respectively, as shown in FIG. 41; and pressure is released from outer surfaces 20 and 22 of clip arms 12 and 14, allowing cable routing clip 400 to return to the configuration shown in FIG. 37. It is anticipated that either of the described methods can be used to mount either of the described embodiments of cable routing clip 10 or 400 to a wall 448 including appropriate length tab slots 450 and 452.

Figure 42:
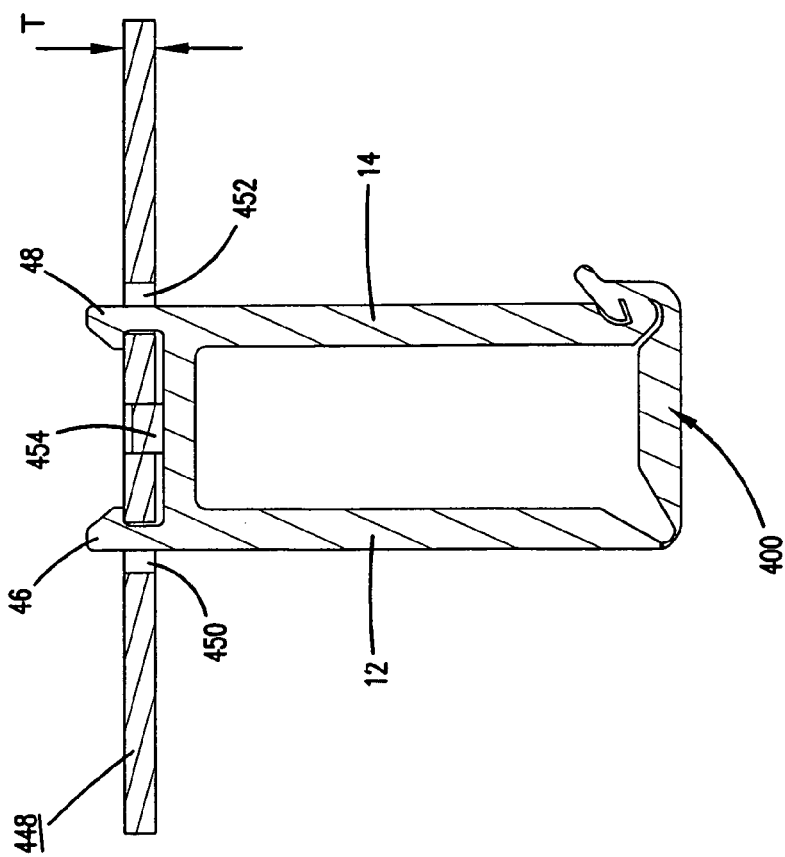
FIG. 42 is a top cross-sectional view of the cable routing clip of FIG. 41 taken perpendicular to the wall at a midpoint of the cable routing clip.

When mounting cable routing clip 10 or 400 to a wall, it is desirable for the clip to fit securely to the wall without excessive movement. However, as stated above, this requires that distance B be approximately the same thickness as the wall. Alternatively, for mounting a clip 10 or 400 to a wall 448 with a thickness T which is less than distance B, as shown in FIG. 42, a feature such as a dimple 454 may be formed in wall 448 between tab slots 450 and 452. Dimple 454 rests against outer surface 28 of crosspiece 24 and offsets outer surface 28 away from wall 448. The amount of offset required, and thus the height of dimple 454 is determined by the difference between distance B and thickness T. This will permit a cable routing clip 10 or 400 to have a standard distance B between outer surface 28 of crosspiece 24 and locking notches 54 and 56, and still be adaptable to mounting on walls of varying thickness, up to a maximum thickness of B.

With regard to the foregoing description, it is to be understood that changes may be made in detail, especially in matters of the construction materials employed and the shape, size and arrangement of the parts without the scope of the present invention. It is intended that the specification and depicted aspects be considered exemplary only, with a true scope and spirit of the invention being indicated by the broad meaning of the following claims.

What is claimed is as follows:

1. A cable clip comprising:
an outer housing including a first end with an inner portion and an outer portion, a second end with an inner portion and an outer portion, and a side with an inner portion and an outer portion, the inner portions of the first end, the second end and the side defining an open sided space;
a gate hingedly mounted to the first end and movable to a closed position across the open sided space and releasably attached to the second end; and
the outer portions of the first end, the second end and the side including first, second and rear grooves, respectively, for receiving a first edge, a second edge and a rear edge, respectively, of a mounting opening, the first and second grooves having recesses for receiving a tab formed in each of the first and second edges of the mounting opening.

2. The cable clip of claim 1, further comprising a plurality of members extending from the outer housing into the open sided space and defining a plurality of cable slots within the open sided space, the cable slots having a depth and a width, the members being spaced apart so that the width of the cable slots is sized to receive telecommunications cable.

3. The cable clip of claim 2, wherein the plurality of members extend from the inner portion of the side into the open sided space.

4. The cable clip of claim 1, wherein the first end includes a pivot and the second end includes a catch, and the gate engages and rotates about the pivot and is adapted to releasably engage the catch, the gate covering the open end of the slots when in a closed position engaging the catch and being movable to an open position upon disengaging the catch.

5. A method of mounting a cable clip on a wall comprising:
providing a cable clip comprising:
an outer housing including a first end with an inner portion and an outer portion, a second end with an inner portion and an outer portion, and a side with an inner portion and an outer portion, the inner portions of the first end, the second end and the side defining an open sided space;

a gate hingedly mounted to the first end and movable to a closed position across the open sided space and releasably attached to the second end; and the outer portions of the first end, the second end and the side including first, second and rear grooves, respectively, for receiving a first edge, a second edge and a rear edge, respectively, of a mounting opening, the first and second grooves having recesses for receiving a tab formed in each of the first and second edges of the mounting opening;

orienting the cable clip so that the first end forms an upper portion or a lower portion and the second end forms the other of the upper portion or the lower portion, the upper and lower portions having upper and lower inner portions, outer portions, and grooves, respectively;

holding the clip so that the rear groove is parallel to the wall, the wall having a mounting opening with a lower edge having a lower tab, an upper edge having an upper tab, and a rear edge;

angling the upper portion into the mounting opening in the wall so that the upper edge engages the upper groove;

deforming the upper and lower ends of the cable clip toward each other; and pivoting the lower end into the mounting opening to engage lower edge with lower groove and rear edge with rear groove.

6. The method of claim 5, wherein the wall is a wall of a cable riser.

7. The method of claim 5, wherein the wall is a wall of a telecommunications rack.

8. The method of claim 5, wherein the cable clip includes a plurality of members extending from the inner portion of the side into the open space defining a plurality of open ended cable slots within the open space, the cable slots having a depth and a width, the members spaced apart so that the width of the cable slots is sized to receive telecommunications cable.

9. The method of claim 5, further comprising opening the gate of the cable clip.

10. The method of claim 5, further comprising releasing pressure on the first end and the second end to allow clip to regain its default shape and allow the wall to engage the lower tab to hold the clip.

11. The method of claim 5, wherein deforming includes applying pressure to the first and second ends of the clip.

* * * * *